(12) United States Patent
Gelbman et al.

(10) Patent No.: US 7,852,787 B2
(45) Date of Patent: Dec. 14, 2010

(54) EXTENSIBLE MICRO-MOBILITY WIRELESS NETWORK ARCHITECTURE

(75) Inventors: Peter Gelbman, Kirkland, WA (US); Mark Adrian Winter, Seattle, WA (US)

(73) Assignee: Clearwire Legacy LLC, Kirkland, WA (US)

( * ) Notice: Subject to any disclaimer, the term of this patent is extended or adjusted under 35 U.S.C. 154(b) by 339 days.

(21) Appl. No.: 12/054,237

(22) Filed: Mar. 24, 2008

(65) Prior Publication Data
US 2008/0232272 A1 Sep. 25, 2008

Related U.S. Application Data

(60) Provisional application No. 60/896,748, filed on Mar. 23, 2007.

(51) Int. Cl.
*H04L 12/28* (2006.01)
(52) U.S. Cl. ........................ 370/254; 370/401
(58) Field of Classification Search ............. None
See application file for complete search history.

(56) References Cited

U.S. PATENT DOCUMENTS

| | | | |
|---|---|---|---|
| 5,953,507 A | 9/1999 | Cheung et al. | |
| 6,542,490 B1 | 4/2003 | Ahmadvand et al. | |
| 6,625,658 B1 | 9/2003 | Oguchi et al. | |
| 6,763,007 B1 * | 7/2004 | La Porta et al. | 370/331 |
| 6,988,146 B1 * | 1/2006 | Magret et al. | 709/238 |
| 7,158,497 B2 * | 1/2007 | Li et al. | 370/331 |
| 7,486,641 B2 * | 2/2009 | Reddy et al. | 370/331 |
| 2007/0042771 A1 | 2/2007 | Xiang | |
| 2007/0248054 A1 * | 10/2007 | Chen et al. | 370/331 |

FOREIGN PATENT DOCUMENTS

KR  1020040009873  1/2004

* cited by examiner

*Primary Examiner*—Chirag G Shah
*Assistant Examiner*—Minh-Trang Nguyen
(74) *Attorney, Agent, or Firm*—Davis Wright Tremaine LLP; Michael J. Donohue; Heather M. Colburn

(57) ABSTRACT

A network having an access service network ("ASN") configured to provide full mobility to mobile stations located within a service area. The ASN includes a Layer 2 or data link layer network that is larger, incorporates more nodes, or carries more data communications than Layer 2 networks incorporated in prior art ASNs. Data communications to and from the mobile stations are routed inside the ASN across the Layer 2 network which transports the data communication using a Layer 2 protocol. If the network includes another ASN located adjacent to the first ASN, the two ASNs may communicate directly with one another over a Layer 2 connection. If the network includes another ASN that is not adjacent to the first, Mobile Internet Protocol components may be included in the ASNs and configured to provide mobility between ASNs.

61 Claims, 16 Drawing Sheets

|  | FIXED | NOMADIC | PORTABLE | SIMPLE MOBILITY | FULL MOBILITY |
|---|---|---|---|---|---|
| SS/MS MOBILITY* | NONE | NONE DURING A SESSION | 5 KM/H | UP TO 60 KM/H WITH NO PERFORMANCE DEGRADATION, 60 TO 120 KM/H WITH GRACEFUL** PERFORMANCE DEGRADATION | UP TO 120 KM/H WITH NO PERFORMANCE DEGRADATION |
| TOTAL HANDOVER LATENCY* | N/A | N/A | BEST EFFORT | <1 SEC BETWEEN IP SUBNETS, <150 MS WITHIN IP SUBNET | <FFS BETWEEN IP SUBNETS <50 MS WITHIN IP SUBNET |
| HANDOVER DATA TRANSMISSION DISRUPTION TIME* | N/A | N/A | BEST EFFORT | <150 MS | < LARGER OF (5MS, ONE FRAME TIME) |
| SESSION CONTINUITY* | NO | NO | BEST EFFORT | SIMPLE IP INTRA-AN: REQUIRED  INTER-AN: OPTIONAL/BE | MOBILE IP REQUIRED |  REQUIRED |

FIGURE 1
(PRIOR ART)

| | FIXED | NOMADIC | PORTABLE | SIMPLE MOBILITY | | | FULL MOBILITY |
|---|---|---|---|---|---|---|---|
| | | | | SIMPLE IP | MOBILE IP | | |
| IDLE MODE SUPPORT[4] | OPTIONAL | OPTIONAL | OPTIONAL | INTRA-AN: REQUIRED | REQUIRED | | REQUIRED |
| | | | | INTER-AN: OPTIONAL | | | |
| REATTACHMENT SUPPORT[5] | REQUIRED[5] | REQUIRED[5] | REQUIRED[5] IF HANDOVER NOT SUPPORTED. MAY BE SUPERSEDED BY HANDOVER SUPPORT | SUPERSEDED BY HANDOVER REQUIREMENT | | | SUPERSEDED BY HANDOVER REQUIREMENT |
| TARGET APPLICATIONS[3] WHILE STATIONARY | REAL-TIME AND NON-REAL-TIME[2] | | | | | | |

**FIGURE 2
(PRIOR ART)**

|  | FIXED | NOMADIC | PORTABLE | SIMPLE MOBILITY | FULL MOBILITY |
|---|---|---|---|---|---|
| TARGET APPLICATIONS SUPPORTED WHILE MOVING (INCLUDING HANDOVERS)*,[1,3] | N/A | N/A | NON-REAL-TIME | NON-REAL-TIME | REAL-TIME AND NON-REAL-TIME[2] |
| EXAMPLE TARGET APPLICATION[1,3] FOR MOBILE OPERATION | N/A | N/A | E-MAIL, WEB, FTP FILE TRANSFER, VIDEO STREAMING (W/ BUFFERING), IPSEC/VPN | E-MAIL, WEB, FTP FILE TRANSFER, VIDEO STREAMING (W/ BUFFERING), IPSEC/VPN | VOIP[3], VIDEO STREAMING, VIDEO TELEPHONY, INTERNET GAMING AND E-MAIL, WEB, FTP FILE TRANSFER, VIDEO STREAMING (W/ BUFFERING), IPSEC/VPN |
| ASSOCIATE WITH MULTIPLE BASE STATIONS | OPTIONAL | OPTIONAL | OPTIONAL | OPTIONAL | YES. MAY RECEIVE DATA FROM MULTIPLE BS AND COMBINE OR DO FAST CELL SWITCHING |

FIGURE 3
(PRIOR ART)

| | FIXED | NOMADIC | PORTABLE | SIMPLE MOBILITY | FULL MOBILITY |
|---|---|---|---|---|---|
| DEVICE TYPE SUPPORT | STANDALONE CPE GATEWAY | STANDALONE CPE PCMCIA GATEWAY EMBEDDED DEVICES (LAPTOPS) | STANDALONE CPE PCMCIA GATEWAY EMBEDDED DEVICES (LAPTOPS) | STANDALONE CPE PCMCIA COMPACT FLASH GATEWAY EMBEDDED DEVICES (LAPTOPS) MINI PCI PDAS | STANDALONE CPE PCMCIA COMPACT FLASH GATEWAY MINI PCI PDAS, HANDSETS W/ OR W/O BUILT-IN PDAS, EMBEDDED DEVICES (LAPTOPS. MP3 PLAYERS, CAMERAS, VEHICULAR APPLICATIONS, LOCATION BASED SERVICE DEVICES) |
| HANDOVER SUPPORT | N/A | N/A | OPTIONAL | REQUIRED | REQUIRED |
| SLEEP MODE SUPPORT | OPTIONAL | OPTIONAL | OPTIONAL | REQUIRED | REQUIRED |

FIGURE 4
(PRIOR ART)

EXTENSIBLE MICRO-MOBILITY WIRELESS NETWORK ARCHITECTURE

CROSS REFERENCE TO RELATED APPLICATION(S)

This application claims the benefit of U.S. Provisional Application No. 60/896,748, filed Mar. 23, 2007.

BACKGROUND OF THE INVENTION

1. Field of the Invention

The present invention is directed generally to wireless communication systems.

2. Description of the Related Art

The terms roaming and mobility are typically used synonymously to refer to the general concept of a wireless subscriber being able to move around on a network instead of being chained to a single location. Starting from a high-level perspective, the specific functionalities related to how and where a user may roam are primarily determined by (1) ownership of the network, (2) the technology used by the network, (3) network attachment mechanisms (i.e., the means by which a user stays attached or re-attaches to the network), and (4) what type of service(s) must be supported during network re-attachment. By applying different requirements and definitions to the above criteria, one can create different contexts in which the commonly used terms "roaming," "mobility," and "handover" have different meanings.

There are two distinct classes of functionality involved when a roaming user moves from a first network into a second network. The first class of functionality is called administrative roaming and involves functionality related to the authentication model, credentials, billing, and cross authentication between the network operators. The second class of functionality is called network roaming and involves functionality related to network handover/re-attachment, whether the application sessions are maintained, and whether the network connectivity is broken or seamless (e.g., whether the internet protocol ("IP") connection is maintained).

"Horizontal" handover roaming refers to the technical ability to handover from one base station to another within the same technology (e.g. from WiMAX to WiMAX, WiFi to WiFi, and the like). "Vertical" handover roaming refers to the technical ability to handover between base stations using two different types of technology (e.g., from WiMAX to WiFi, 3G to WiMAX, and the like). Many technical issues make vertical roaming difficult. In fact, many of these technical issues relate to horizontal roaming between different operators using the same technology. These technical issues include what happens when a user roams onto a network having Quality of Service ("QoS") offerings that are different from (higher or lower than) the QoS offerings of the network to which the user was previously connected, how to navigate varying qualities of service, and perhaps most difficult of all, how to navigate different roaming policies and prices.

Mobility is generally defined as maintaining an ongoing data session during a change in a user's device point of attachment (base station or access point) to the radio network. Mobility may be broken down into two types: micro-mobility (Layer 2 mobility) and macro-mobility (Layer 3 mobility). Layer 2 and Layer 3 refer to layers of the Open Systems Interconnection Basic Reference Model (also referred to as the OSI Reference Model, OSI Model, and OSI seven layer model). The OSI Reference Model is a layered, abstract description of communications and computer network protocol design. Within this model, Layer 2 ("the data link layer") responds to service requests from Layer 3 ("the network layer"), which is also referred to as the IP layer, and issues service requests to Layer 1 ("the physical layer").

Micro-mobility is the simplest form of mobility and essentially involves handoffs between radio base stations belonging to a single Layer 2 Access Service Network ("ASN"). Layer 2 transfers data between adjacent network nodes in a wide area network ("WAN") as well as between nodes on the same local area network ("LAN") segment. Ethernet for local area networks is an example of a data link layer protocol. Within Layer 2, data link layer addresses, such as MAC addresses are used to route data between nodes. Layer 3 is responsible for end-to-end (source-to-destination) packet delivery, whereas the data link layer is responsible for node-to-node (hop-to-hop) frame delivery. Layer 3 is referred to as the Internet layer in the TCP/IP reference model. Within Layer 3, network layer addresses, such as IP addresses are used to route data between a source and a destination.

Within an ASN, the user is assigned an IP address that does not change as the user moves from one base station to another. However, the user's data link layer address does change as the user moves from one base station to another. Since the user's IP address does not change, the user's network applications/services are affected only by the speed at which the mobile station and base station can negotiate the Physical Layer/Media Access Control ("PHY"/"MAC") aspects of the handover.

Macro-mobility often refers to an inter-ASN handover which occurs when a user moves across the service edge of one Layer 2 network into another Layer 2 network. This occurs when two ASNs are geographically adjacent to one another, and the user's connection is transferred from a first base station belonging to a first ASN to a second base station belonging to a second ASN. Typically, after such a handover, the user is attached to a network serviced by a different Layer 3 router. How the handover is effected dictates the impact to the user's network service. Generally, after the handover, the user has a new IP address, which causes connection oriented network applications and services to terminate.

Macro-mobility scenarios typically include both administrative and network roaming complexities. A wireless subscriber service area may involve movement between two networks that fall under the ownership/administration of completely distinct organizations (e.g., ISPs). For example, within a wireless subscriber service area, one base station may be operated by carrier "A" and a second base station operated by carrier "B." The two networks must collaborate to complete the handoff and conduct authentication, authorization, and accounting ("AAA") activities between the networks. These arrangements are similar to efforts in the voice-centric cellular industry that have been developed over many years.

Micro-mobility and macro-mobility are typically facilitated via radio architectures that allow a data session (or call) to be continued as a subscriber moves or transitions from one base station to another. At the radio architecture level, there are many mobility management parameters and functions that dictate the level of performance experienced by both the user and the network during the transition. Typical mobility management functions include the following:

Basic RF Configuration Parameters (frequency, bandwidth, channel maps);

RF scanning mechanisms;

Initial network entry, Idle mode, Handover, and network re-entry functions;

Network Information, such as Net ID, Net configuration, Neighbor lists;

Cell/Sector Reselection Algorithms;
Radio Resource Management (RRM) and Control (RRC);
Association/Registration/Authentication;
Paging Control;
Data Path functions; and
IP address allocation.

IEEE 802.11 Technologies

With respect to IEEE 802.11 related technologies, WLAN roaming or nomadic operations differ from micro-mobility and macro-mobility because in WiFi networks, a session is simply terminated and restarted when the mobile station enters a new IEEE 802.11 access point cell. WLAN roaming, as currently implemented by the popular WiFi hotspot model, is essentially a form of administrative roaming without network roaming.

IEEE 802.11a/b/g technology is a standardized technology that has become pervasive enough that many user devices, such as laptops, now include common wireless systems that can work across many operators' networks. Such user devices, which are configured for use with a subscriber's home or "normal" access service network may also physically connect to a new IEEE 802.11a/b/g wireless access network. Typically to connect to the new IEEE 802.11a/b/g wireless access network, the subscriber is temporarily granted a caged IP connection and directed to a webpage where the user can choose to purchase a temporary connection (by the hour, day, etc.). If the user already subscribes to a service that permits the user to access the new network, the user may authenticate with the network manually using a user-space login (as opposed to a hardware/MAC type authentication process). If the user purchases a temporary connection or successfully authenticates with the network, the user is granted a public IP address, DNS services, and the like, and is granted access to the Internet.

The WiMAX Service Provider Working Group ("SPWG") has worked toward defining a set of usage scenarios that capture the various nuances and functional decomposition of the many types of mobility usage scenarios. FIGS. 1-4 provide a table reproduced from *Recommendations and Requirements for Networks based on WiMAX Forum Certified Products*, Release 1.5, Service Provider Working Group, WiMAX Forum, Jan. 23, 2008, depicting the efforts of the WiMAX SPWG in this regard.

Mobile Internet Protocol

Wireless communications systems are increasingly employing Mobile Internet Protocol ("MIP") technologies to facilitate various levels of network roaming and mobility. MIP is an Internet Engineering Task Force (IETF) standard communications protocol designed to allow mobile device users to move from one network to another while maintaining the same or a "permanent" IP address. MIP maintains a constant IP address for a mobile station that is separate from the local Point-of-Attachment (PoA) IP address.

MIP is a network layer (i.e. Layer 3) approach to wireless mobility that is designed to address all forms of macro-mobility roaming. MIP has generally been accepted as an elegant solution to address all forms of wireless macro-mobility, and roaming. MIP was originally specified by Internet Engineering Task Force (IETF) as a standard extension to IPv4. MIP is also included in the IETF IPv6 standards. The 3GPP2 project, and WiMAX Forum and several other mobile wireless technologies such as Flarion and iBurst have essentially integrated MIP into the radio system architecture as the core mobility/roaming mechanism. Despite undergoing 12 years of development, MIP has yet to see widespread deployments and adoption by end-users.

Referring to FIG. 5, a block diagram illustrating a prior art WiMAX Network Reference Model 100 ("NRM") implementing MIP is provided. Within the various figures, like reference numerals refer to like components. Further, with respect to interfaces and connections between the various components illustrated, solid lines have been used to identify bearer (data path) interfaces or connections and dashed lines have been used to identify control plane interfaces or connections. For illustrative purposes, a WiMAX Profile C ASN network architecture as defined in *WiMAX Forum Network Architecture (Stage 2: Architecture Tenets, Reference Model and Reference Points)*, Release 1, Version 1.2, Jan. 11, 2008, will be described but those of ordinary skill in the art appreciate that alternate implementations exist in the prior art.

The various components of the model 100 are coupled together by interfaces R1-R5 as defined by the WiMAX Forum. The model 100 includes a first ASN 110 coupled to a second ASN 112 by an R4 interface. As defined by the WiMAX forum, the R4 interface is a Layer 3 connection. The model 100 also includes a first Core Services Network 120 ("CSN"), and a second CSN 122 both of which are coupled to the first ASN 110 by separate R3 interfaces.

Generally, the model 100 assumes the first ASN 110 and the first CSN 120 are owned and operated by two different business entities, a Network Access Provider 130 ("NAP") and a Network Service Provider 132 ("NSP"), respectively. The model 100 also assumes the first ASN 110 and the second CSN 122 are owned and operated by two different business entities, the NAP 130 and a NSP 134, respectively. Optionally, the first CSN 120 and the second CSN 122 may be owned and operated by two different business entities, the NSP 132 and the NSP 134, respectively. With respect to a particular mobile station (not shown), the NSP 132 is a Visited NSP and the NSP 134 is a Home NSP. The first CSN 120 and the second CSN 122 are coupled to blocks 140 and 142, respectively. The blocks 140 and 142 each represent either the Internet or an Application Service Provider ("ASP").

The model 100 and other related architecture decompositions are largely functional based, meaning they focus on the network functions provided within each "box." In this context, the first and second ASNs 110 and 112 are considered to be one box and the first and second CSNs 120 and 122 are considered to be a second box. Fundamentally, the model 100 is predicated on the assumption that the NAP 130 may wish to sell wholesale access service (i.e., the services offered by the ASNs 110 and 112) to the first and second NSPs 132 and 134 who own the CSNs 120 and 122, respectively. There is a further implicit assumption that the networking equipment of the ASNs 110 and 112 and the networking equipment of the CSNs 120 and 122 will be physically located in different geographic locations and will be coupled together with WAN (Layer 3) connections (e.g., R3 and R5 interfaces).

Unfortunately, this model does not capture many aspects of common, real world deployments operated by wireless network providers. In many cases, a network operator as a single entity owns and operates the ASNs 110 and 112 and at least one of the CSNs 120 and 122. In WiMAX terminology, such an entity is defined as a NAP+NSP. In a NAP+NSP, a single company owns the networking equipment of both the ASNs and the CSNs.

In terms of wholesaling services, services resold by the network operator typically include end user facing services/applications that use both the ASN and the CSN networking elements. The wholesale customer may be completely abstracted from both the ASN and the CSN. Such a wholesale customer is more accurately described using the WiMAX NRM definition of an ASP. Presently, nearly every wireless operator in the world that is considering large-scale mobile broadband wireless network deployments is either an ASP or taking steps to become one. Examples of such ASPs include large cellular operators in the United States, such as Sprint, Verizon, and AT&T Mobility.

Referring to FIG. 6, a block diagram of the components of the ASN 110 is provided. For illustrative purposes, the ASN 110 is depicted as being a WiMAX Profile C ASN. In the ASN 110, mobility management functions are divided between two network elements, a base station 200 ("BS") and an ASN-Gateway router 210 ("ASN-GW"). While the ASN 110 is illustrated as having a single BS 200, it is appreciated by those of ordinary skill in the art that the ASN 110 may include a plurality of base stations. The ASN-GW 210 is coupled to the BS 200 by an R6 interface as defined by the WiMAX Forum. The R3 interface may be used couple the ASN-GW 210 to one of the CSNs 120 and 122 (see FIG. 5). The R4 interface may be used to couple the ASN 110 to another ASN (not shown). The R3, R4, and R6 interfaces refer to interfaces defined by the WiMAX Forum. The R3 and R4 interfaces are Layer 3 connections. However, the R6 interface is a Layer 2 connection.

The ASN-GW 210 includes the following functions: a Data Path function 220; a Handover Function 222; a Context Function 224; a Proxy-Mobile-IP ("PMIP") Client 226; an Authentication, Authorization and Accounting ("AAA") Client 226; a Hotline function 230; a Radio Resource Management ("RRM") Relay 232; a Paging Controller 234; a Location Register 236; an Authenticator 238; a Key Distributor 240; a Dynamic Host Configuration Protocol ("DHCP") Proxy/relay 242; a Service Flow Authorization 244 ("SFA"); and a foreign agent ("FA") function 246. Each of these functions is well known in the art and need not be described in detail.

The BS 200 includes the following functions: a Data Path function 250; a Handover Function 252; a Service. Flow Management ("SFM") function 254; a Context Function 256; a Radio Resource Control ("RRC") function 258; a Radio Resource Allocation ("RRA") function 260, an Authorization Relay 262, and a key receiver function 264. Each of these functions is well known in the art and need not be described in detail.

Referring to FIG. 7, a block diagram of an IP subnet 300 of a prior art network incorporating three WiMAX ASNs 110, 112, and 310 and CSN 120 is provided. In FIG. 7, dashed lines R4 and R6 are used to illustrate WiMAX specified interfaces. By way of non-limiting example, the R4 interface illustrates an ASN-to-ASN interface and the R6 interface illustrates a BS-to-ASN-GW interface. Each BS communicates with its respective ASN via the RG interface and each ASN can communicate with other ASNs via the R4 interface. For the sake of clarity, FIG. 7 only shows a single RG interface between the BS30 and the ASN 210b and a single R4 interface between the ASNs 110 and 112. The ASNs 110, 112, and 310, each serve a group of BSs 320 and 322 that provide radio service to a service area. A mobile station 340 ("MS") located within the service area communicates with the BS 320 over a wireless communication connection 341.

Within each ASN 110, 112, and 310, the BSs 320 and 322 communicate over R6 interfaces (i.e., BS-to-ASN-GW interfaces) to ASN-GWs 210a-210c, respectively. The BS 320 forwards a data communication received from the MS 340 over the R6 interface to the ASN-GW 210b of the ASN 112. The ASN-GW 210b includes or is coupled to a MIP Foreign Agent ("FA") function or router 330b that communicates with a MIP Home Agent ("HA") function or router 332 in the CSN 120. The ASN-GW 210 "owns" the local IP address of the MS 340, but the HA router 332 terminates the IP address of the MS 340 which HA router 332 advertises to the Internet 140. The local IP address of the MS 340 is used as a tunnel point for the public Mobile IP address that the HA router 332 advertised to the Internet. In this architecture, mobility within a single ASN 110, 112, or 310 and between them may be provided without MIP using ASN-to-ASN R4 interfaces and BS-to-ASN-GW R6 interfaces. However, Layer 3 MIP based architecture is required to provide wide scale mobility.

One of the largest problems with this architecture is that even though the R6 and R4 interfaces provide full mobility within the ASN without MIP, the FA and HA routers 330 and 332, respectively, integral to the MIP design, are based on the fundamental assumption that CSN anchored mobility is a requirement. As such, all traffic to a roaming mobile station is always routed to the HA router 332, located in a centralized CSN 120 even when the vast majority of the traffic does not need to be transported in this fashion.

A data communication from the MS 340 that is not addressed to another MS (not shown) connected to the ASN 112 is received by BS 320 and routed thereby to the ASN-GW 210b. The FA router 330b of the ASN-GW 210 transmits the data communication across a Layer 3 IP connection (identified by line "L3") to the HA router 332, which routes the data communication to the Internet 140. The Layer 3 IP connections (lines "L3"), which couple the FA routers 3301-330c of the ASNs 110, 112, and 310, respectively, to the HA router 332, may traverse long distances before reaching the Internet 140, which negatively impacts performance and increases costs. Because the network operator must deliver all traffic to the centralized HA router 332 before accessing the Internet 140, a large Wide Area Network (WAN) is required to transport communication traffic from the ASNs 110, 112, and 310 to the CSN 120. Such WAN connections may be very expensive.

As the above discussion illustrates, MIP relies on complex Layer 3 router architectures that are unwieldy and expensive to deploy. Further, MIP introduces many issues to network design and deployment that burden a network operator. As an example of the complexities associated with the standards and definitions of MIP, Client-Mobile-IP-v4 (CMIPv4) depends on a MIP client residing in a mobile station. CMIPv4 is part of a core IPv4 protocol stack as specified by the IETF. CMIPv4 is implemented as an "add-on" layer of software in the mobile station. IPv6 as specified by IETF includes inherent support in the IP stack for mobility based on an entirely new IP addressing/routing architecture. In theory, IPv6 solves many problems with CMIPv4; however, IPv6 has yet to be widely deployed and many complex issues exist with transitioning large networks from IPv4. Further, the mobility components of IPv6 are not fully specified, and many technical issues remain regarding its actual implementation in the real world. As a result, popular computer operating systems and mobile devices have actually deployed IPv6 without the mobility components.

In recognition of the issues with CMIP, a concept of Proxy-Mobile-IP (PMIP) has emerged in the last few years. This architecture does not require any MIP related protocols or software on the client mobile station. Instead, PMIP places the client mobility intelligence at the edge of the network in the base stations or first router. These edge base stations or the first router perform a "proxy" function that detects Layer 2 mobility events and triggers the higher level MIP related functions on behalf of the mobile station. In theory, this is considered a good overall solution, as it allows simple mobile stations (e.g., DHCP clients) with no awareness of MIP whatsoever to enjoy the benefits of MIP services. However, PMIP itself has implementation complexities and there are currently different PMIP standards emerging from both IETF and WiMAX for both IPv4 and IPv6. At the present time, there are no stable PMIPv4 or PMIPv6 architectures that an operator can reliably deploy.

Aside from the complexity/confusion related to MIP standards and specifications, there are serious questions as to where and when MIP is required. Further, MIP introduces severe costs to the network in terms of actual increased protocol/software costs in routers, and also in terms of network performance.

At their core, all variants of MIP are predicated on the concept that all IP traffic to and from a mobile station will be routed via a single "home agent" (HA) router, which anchors and advertises the mobile station's or user's IP address to the world. This HA concept assumes the user requires the same IP address at all times, and at all locations, in order to be provided advanced IP services. However, this is not always the case. For example, many advanced IP services such as Voice over IP ("VoIP") have seen widespread commercial adoption without MIP or the implementation of the HA concept. Skype and Vonage are examples of companies that offer commercial VoIP services that allow users to take either their VoIP telephone device or VoIP software client anywhere in the world and maintain their same telephone number and level service. MIP is simply not required to offer such services.

All forms of the MIP architecture require that special functions, such a Foreign-Agent ("FA"), a Proxy-Mobile-IP ("PMIP"), and the Home-Agent ("HA") be resident in the network routers. These routing/software functions add cost and configuration complexity to these routers. As networks grow in terms of the number of users and per-user traffic bandwidth, network elements need to scale efficiently. Unfortunately, routers that require "extra" functions, such as those required by MIP, add additional costs. A network operator may consider these costs unnecessary or unjustified if the network operator does not require these special MIP functions to provide the services the operator wishes to sell.

The MIP architecture by definition also causes suboptimal IP routing performance on the network. In the MIP architecture, all IP packets destined to a mobile station, regardless of that mobile station's physical location in the world, must be routed the mobile station's HA router. For the majority of Internet traffic in the world today this is extremely inefficient and creates severe latency and unnecessary transport costs. For example, assume two users subscribe to Internet access from same Wireless Internet Service Provider ("ISP") located in the United States and are serviced by the same HA router in New York. Further assume, both users are on a business trip to Japan and are both roaming in two different Tokyo ASNs each serviced by a different local FA router. If one of the users places a VoIP call to the other, even though the users are physically located in Japan, and may even be located in the same city, or even the same hotel, the IP packets sent to each of the users are routed back to the HA router in New York before being routed to Japan. Both users would experience latency caused by the long range IP data path which extends from Japan to New York and back again to Japan. This latency is doubled because both parties to the VoIP call are routing packets from Japan to the HA router in New York and back again. In addition to the suboptimal packet routing that the subscribers experience, routing these packets across the world results in excessive WAN transport costs to the network operators who own and manage the networks involved.

MIP specifications have evolved to address some of these issues, yet the solutions proposed simply add additional complexity to an already complex architecture. For example, in order to solve the bearer-path routing problem described above, a feature known as "Mobile IPv4 Dynamic HA Assignment" has been proposed in RFC4433. In this architecture, the HA routers may be dynamically assigned such that a user's IP session need not be permanently anchored to the same HA router. This solution keeps all the complexity of the MIP architecture in place but fundamentally modifies it such that the user's IP address is no longer anchored to a particular "Home" router. In other words, this solution negates the purpose for which MIP was invented. If a user's IP address does not need to be anchored, then why introduce any of the HA related complexity at all?

Presently, wireless communications industry is producing several variants and configurations of MIP that seek to achieve maximum performance. For example, the IETF, 3GPP, 3GPP2, IEEE 802.16e, and WiMAX standards bodies have all introduced sophisticated mobility architectures based on MIP.

Despite the many technical advances associated with solving the mobile Internet problem, most existing strategies continue to operate within a paradigm of Layer 3 network solutions. These architectures are plagued by complexities, high costs, and delays, and in many cases do not actually address mobility system requirements in optimal fashion.

Therefore, a need exists for a network architecture that provides adequate mobility without increasing the cost and complexity of the network. A need also exists for a network architecture using CMIPv4 that provides adequate mobility and may be readily transitioned to IPv6. The present application provides this and other advantages as will be apparent from the following detailed description and accompanying figures.

BRIEF DESCRIPTION OF THE SEVERAL VIEWS OF THE DRAWING(S)

FIGS. 1-4 are a table defining a set of usage scenarios that capture various nuances and functional decompositions of many types of mobility usage scenarios reproduced from *Recommendations and Requirements for Networks based on WiMAX Forum Certified Products*, Release 1.5, Service Provider Working Group, WiMAX Forum, Jan. 23, 2008.

Figure 5:
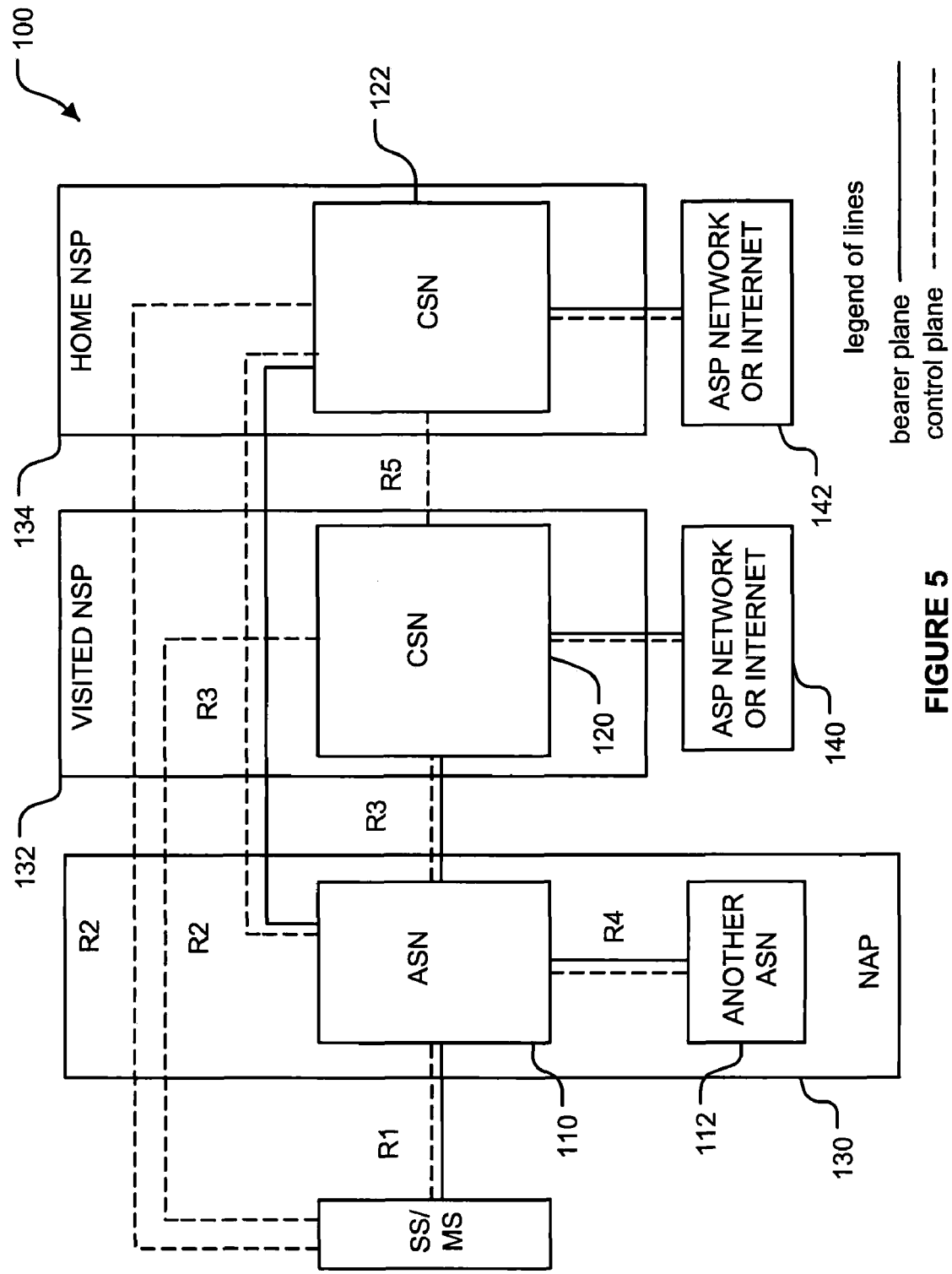
FIG. 5 is a block diagram illustrating a prior art WiMAX Network Reference Model ("NRM") implementing MIP.
Figure 6:
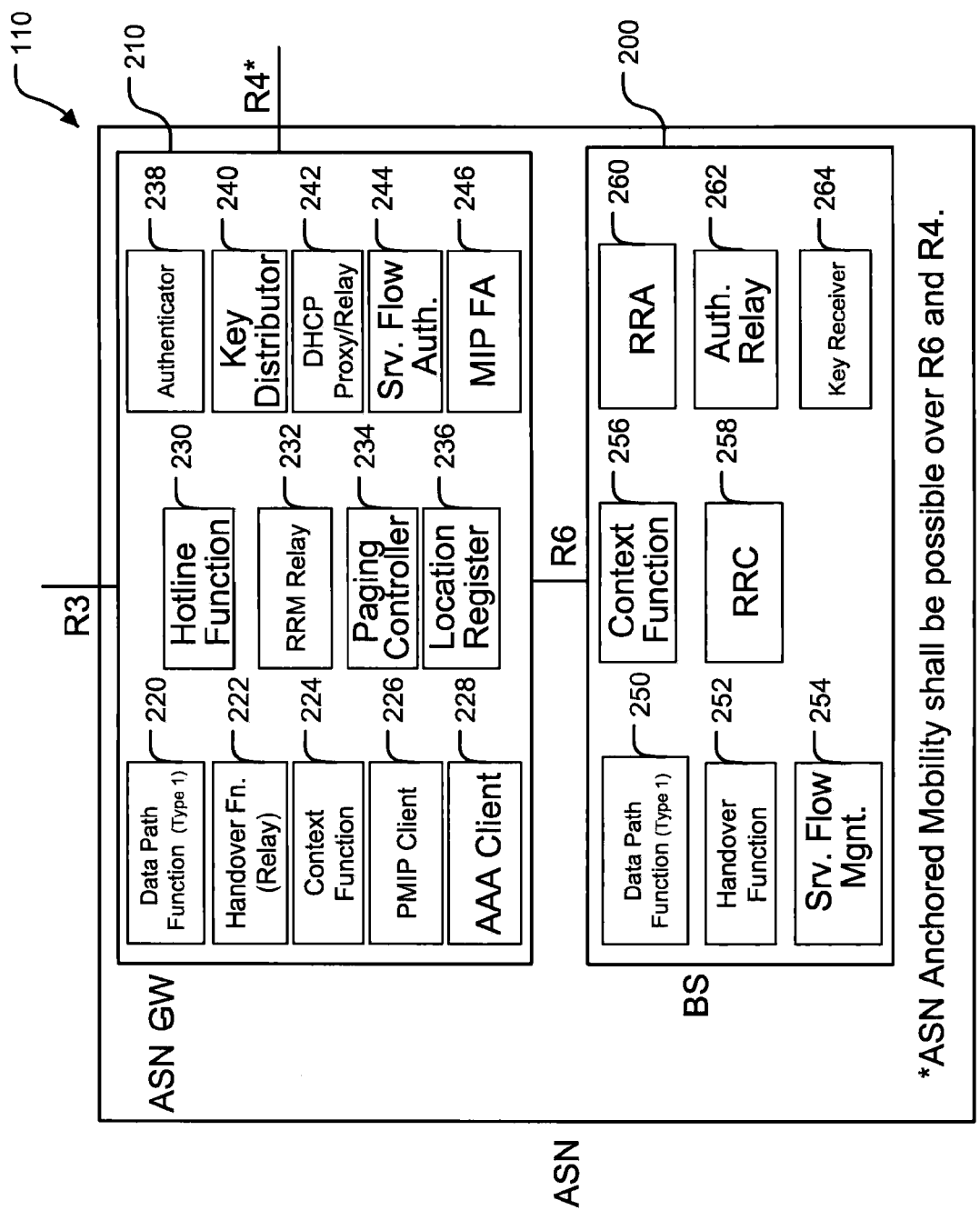

FIG. 6 a block diagram of the components of an ASN of the model of FIG. 5.

Figure 7:
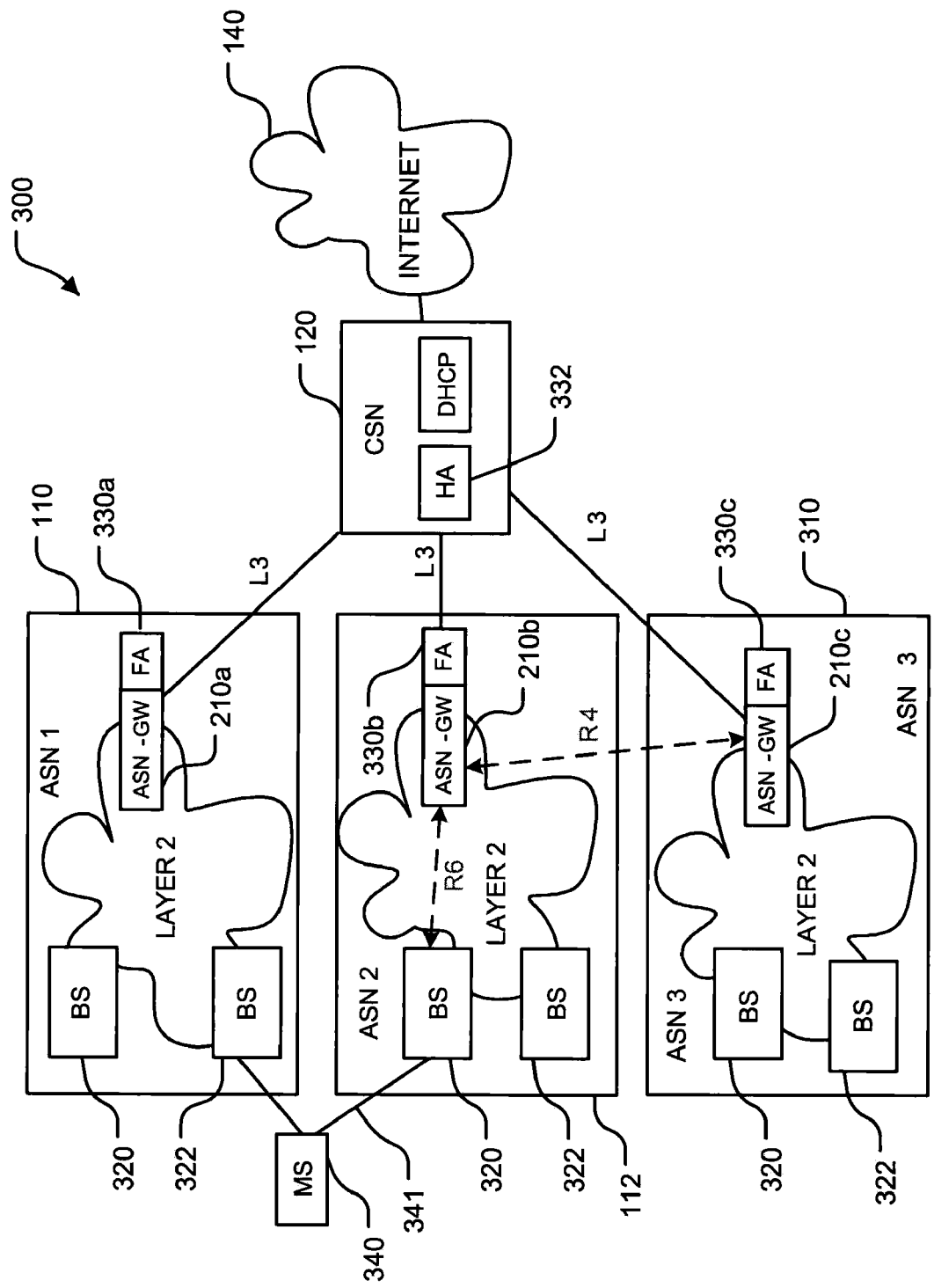

FIG. 7 is a block diagram of an IP subnet of a prior art WiMAX network incorporating three WiMAX ASNs and a CSN.

Figure 8:
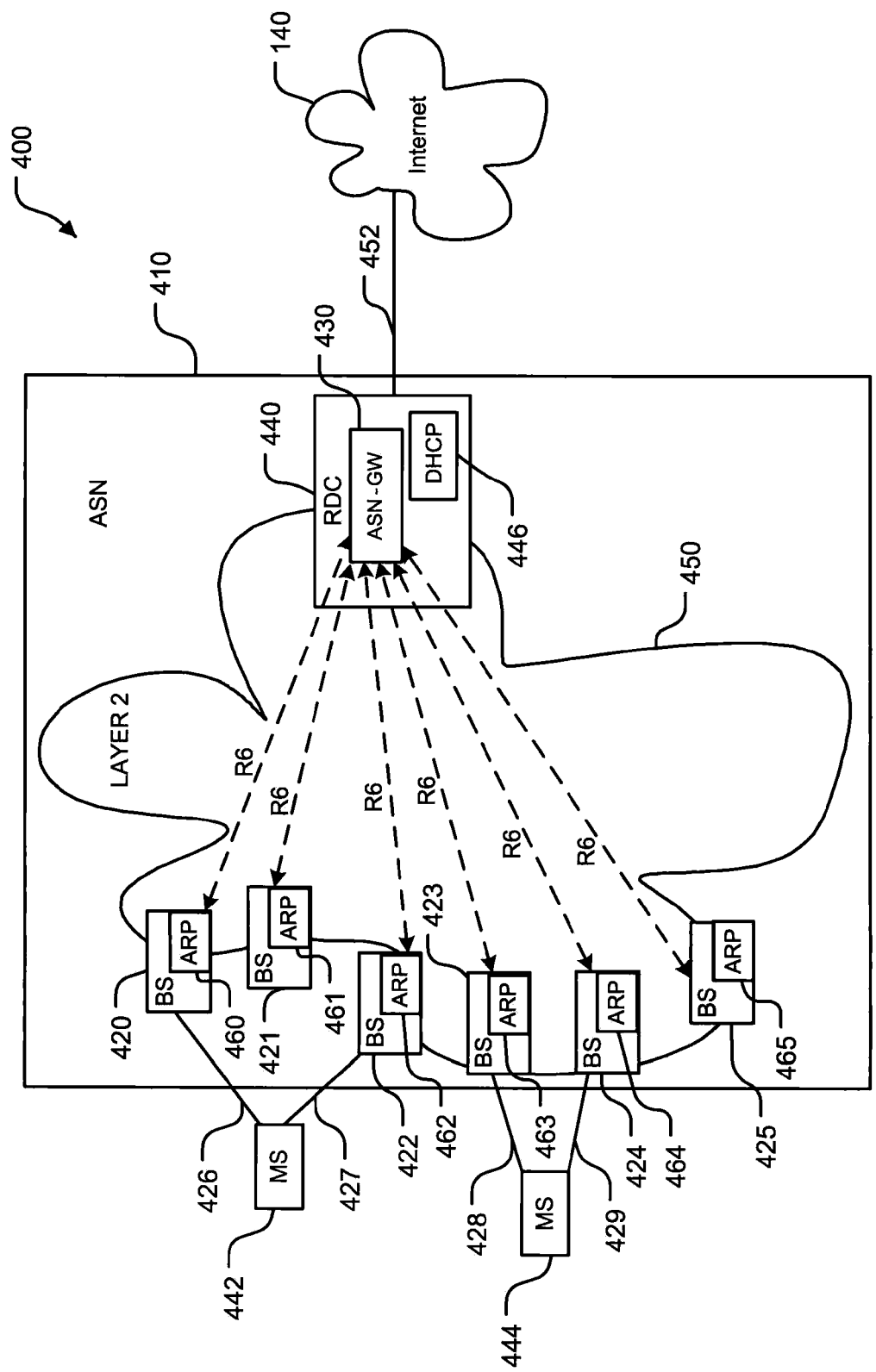

FIG. 8 is a block diagram of a network including a centralized implementation of a Simple IP ASN.

Figure 9:
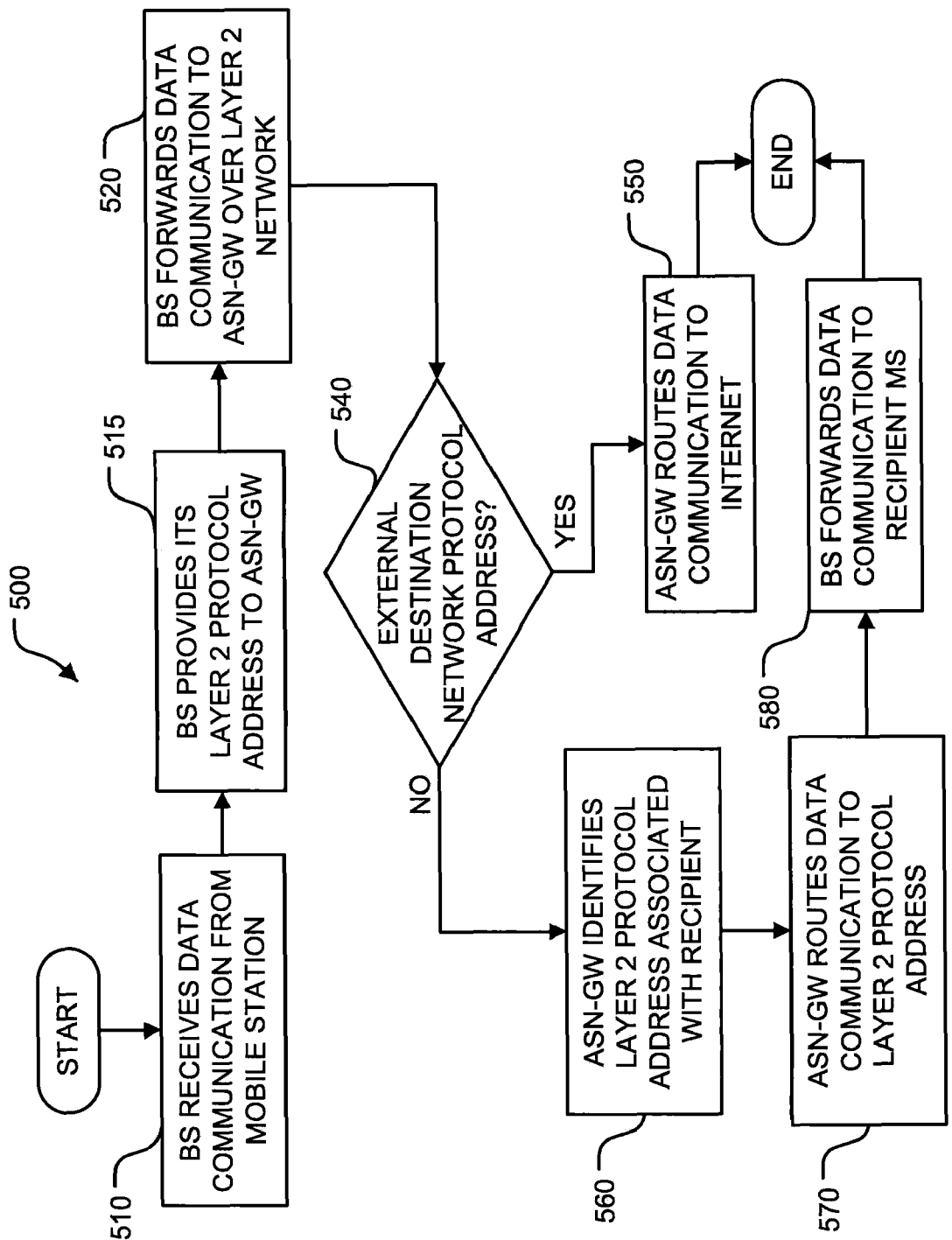

FIG. 9 is a flow diagram illustrating a method performed by the ASN of FIG. 8.

Figure 10:
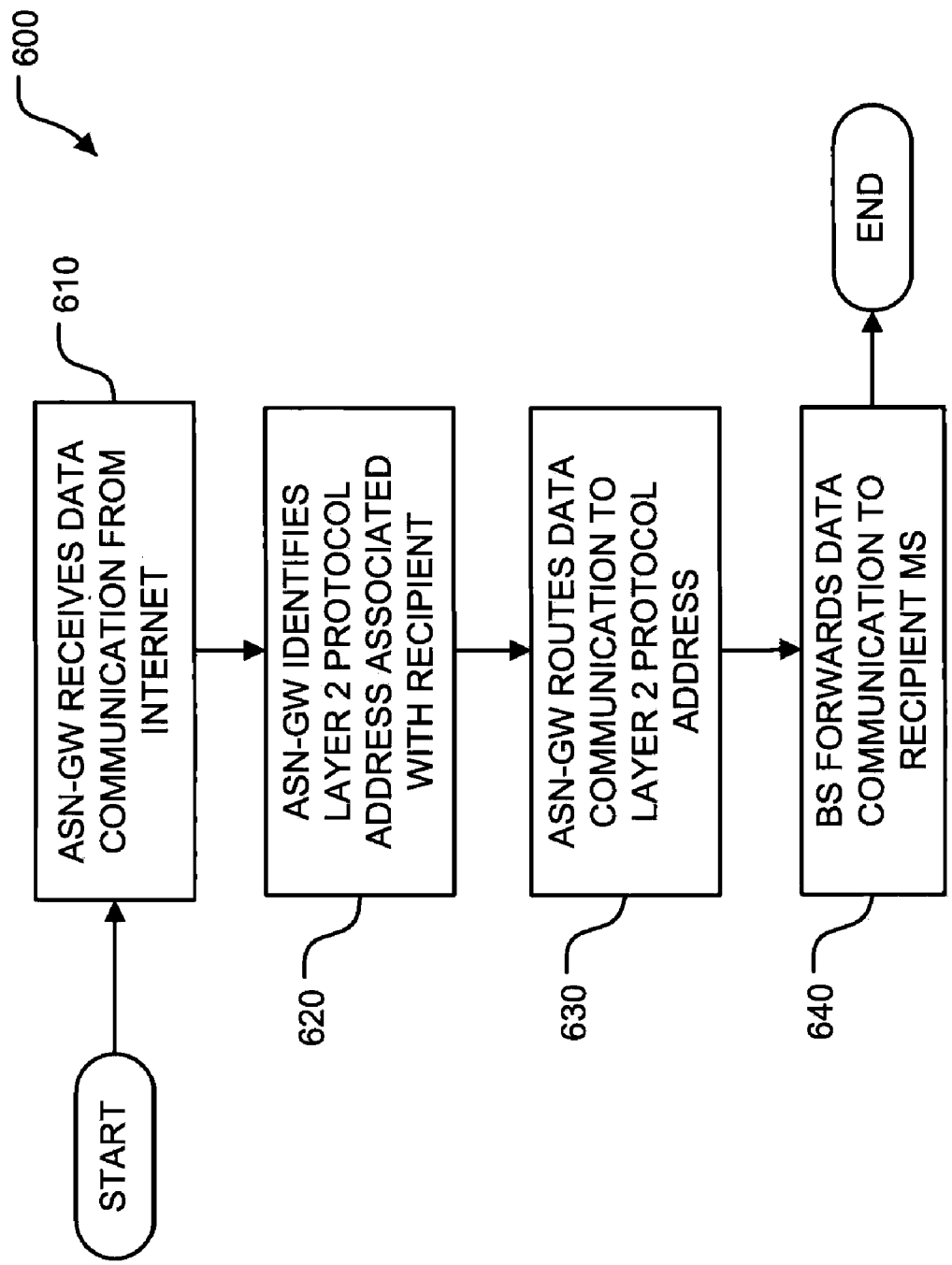

FIG. 10 is a flow diagram illustrating a method performed by the ASN of FIG. 8.

Figure 11:
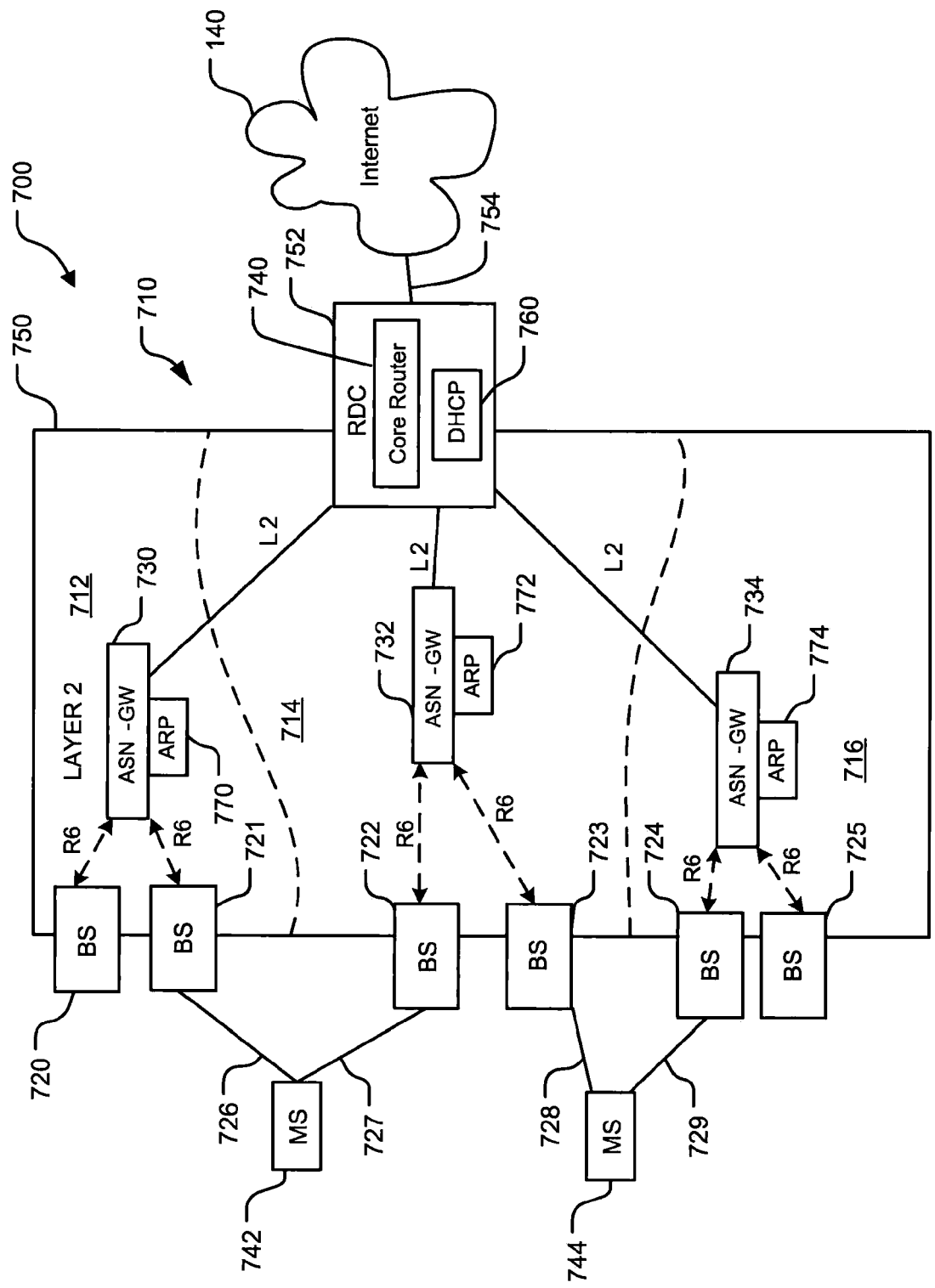

FIG. 11 is a block diagram of a network including a distributed implementation of a Simple IP ASN.

Figure 12:
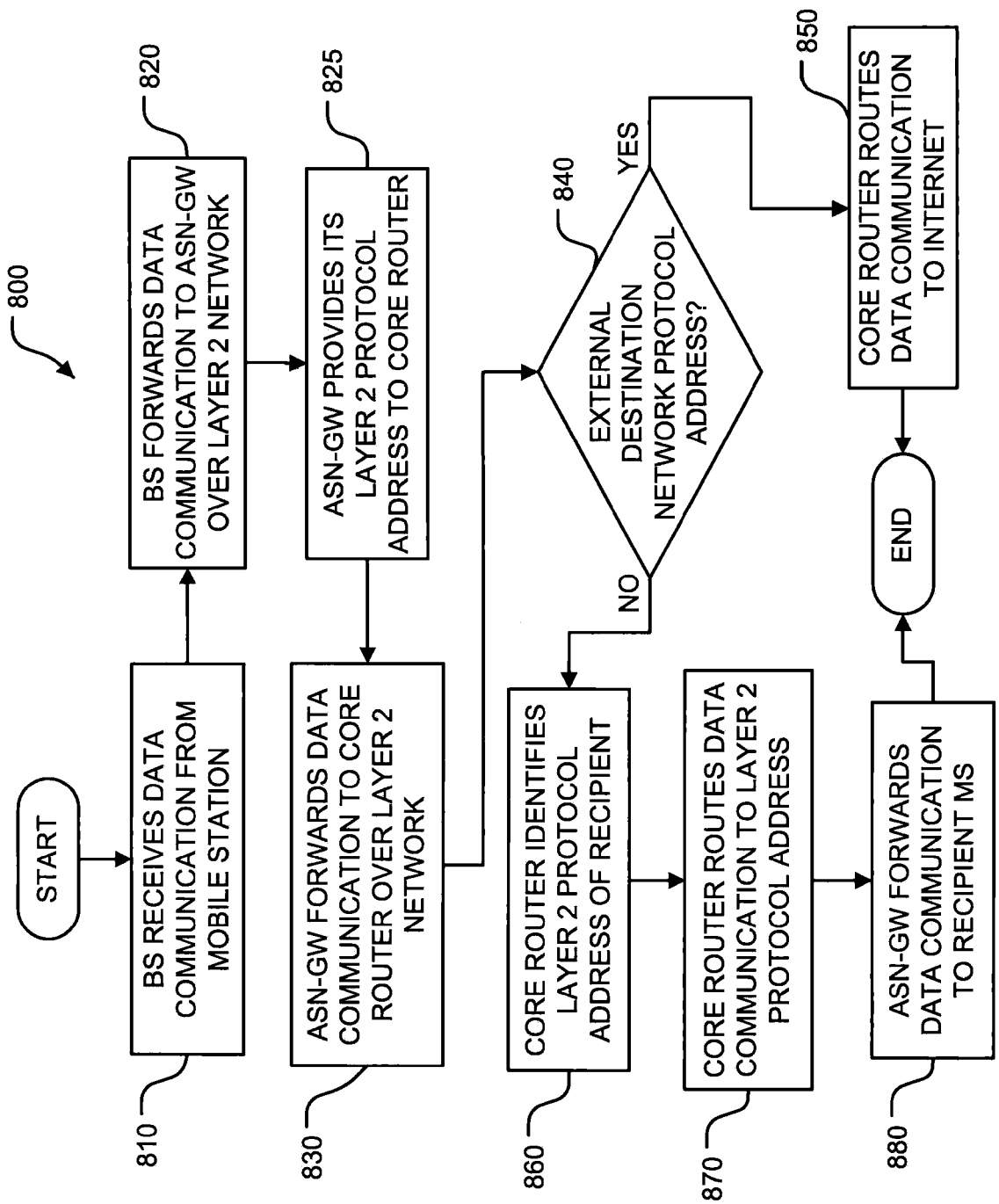

FIG. 12 is a flow diagram illustrating a method performed by the ASN of FIG. 11.

Figure 13:
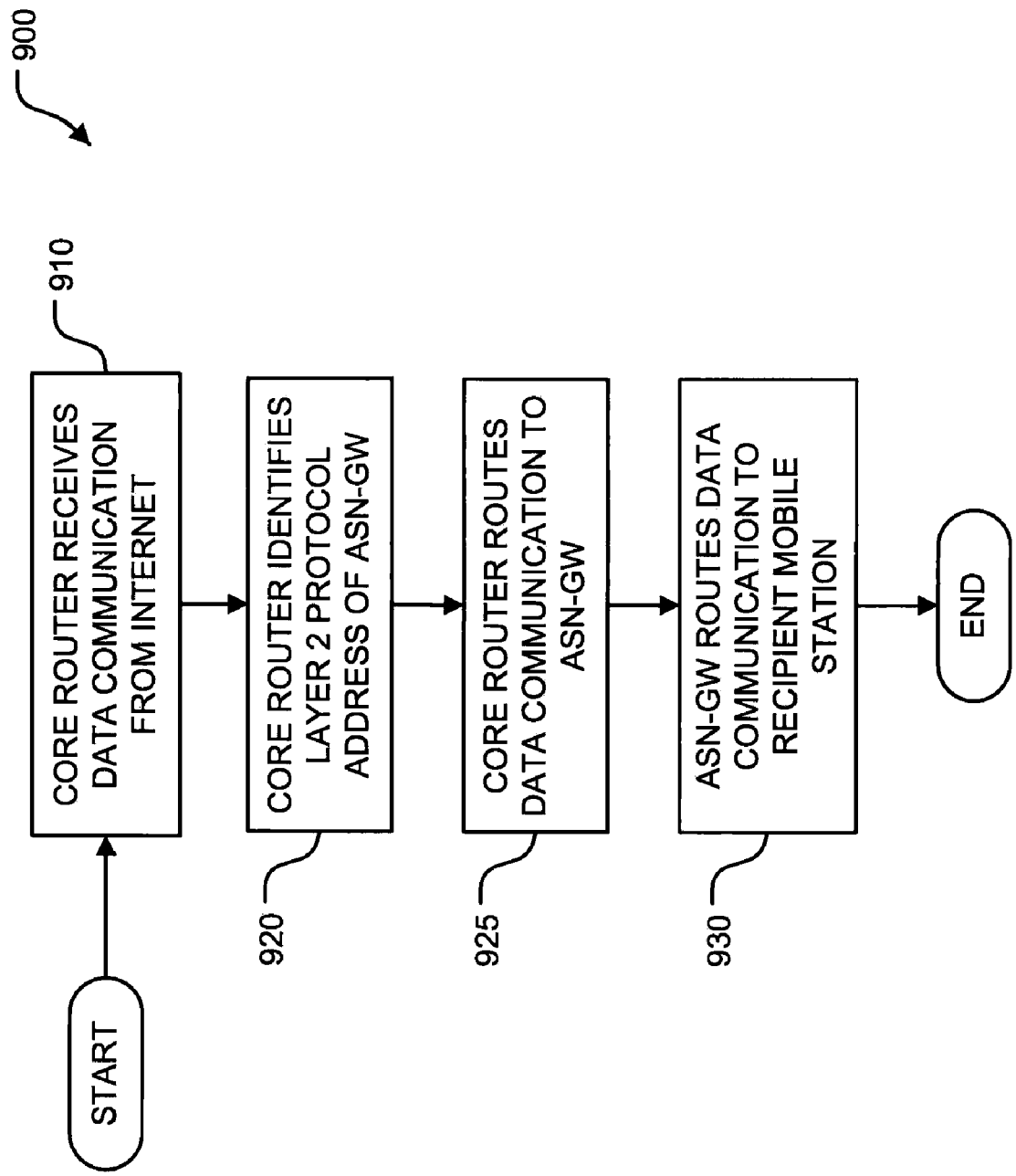

FIG. 13 is a flow diagram illustrating a method performed by the ASN of FIG. 11.

Figure 14:
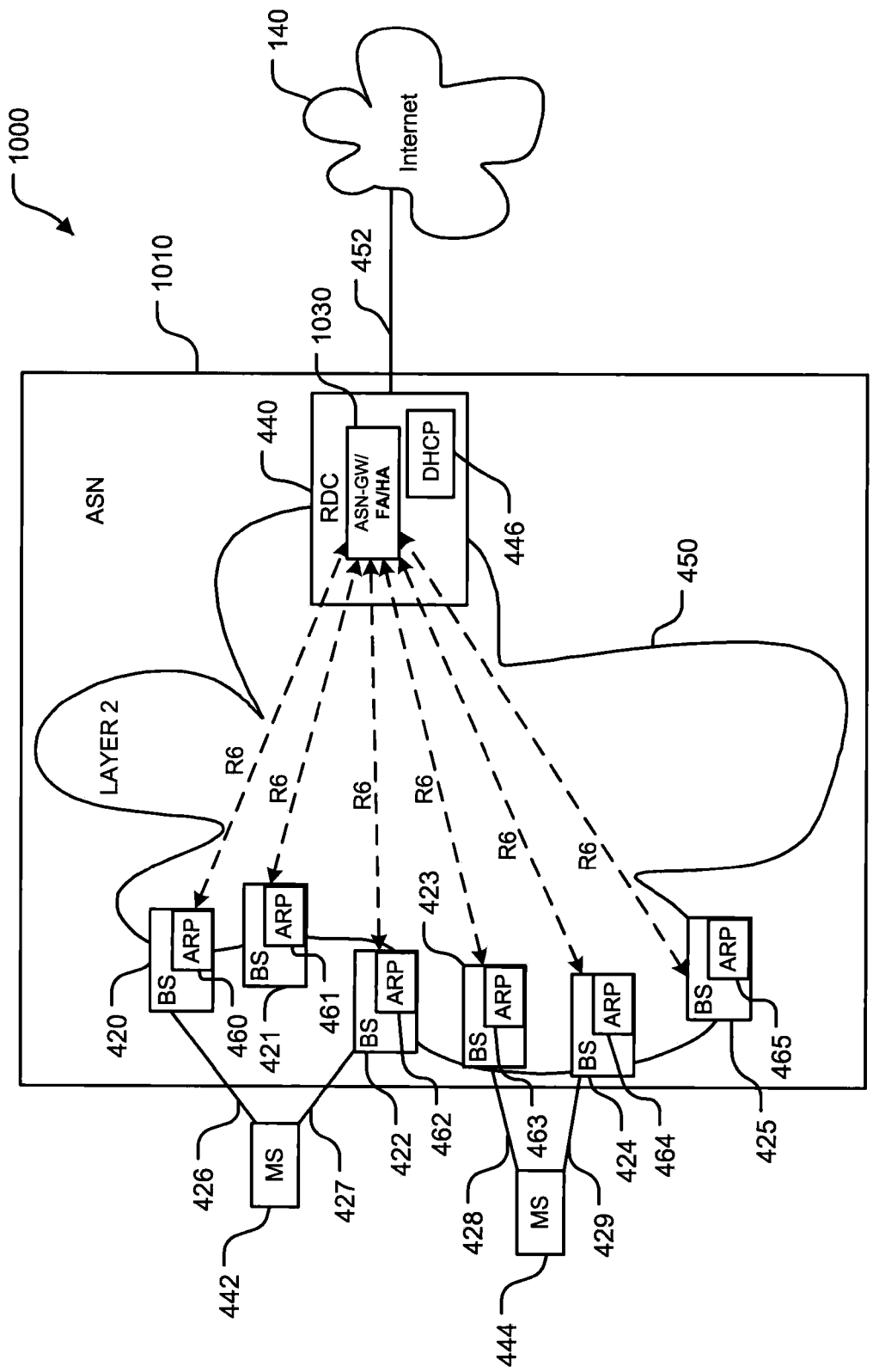

FIG. 14 is a block diagram of the centralized implementation of the Simple IP ASN depicted in FIG. 8 modified to include MIP components.

Figure 15:
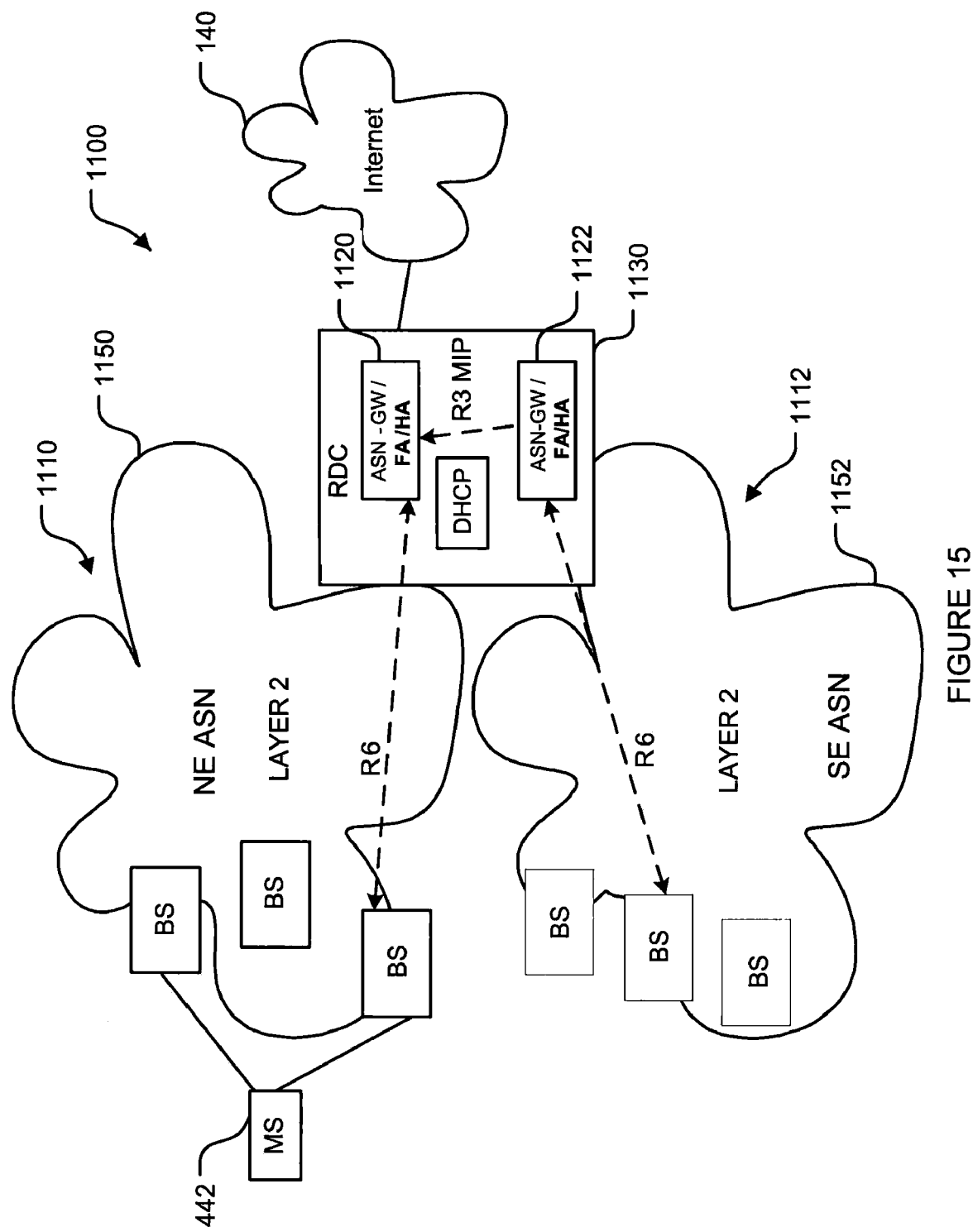

FIG. 15 is a block diagram of a network incorporating a first and second ASN, each ASN having been constructed in accordance with the Simple IP ASN of FIG. 14, which includes MIP components.

Figure 16:
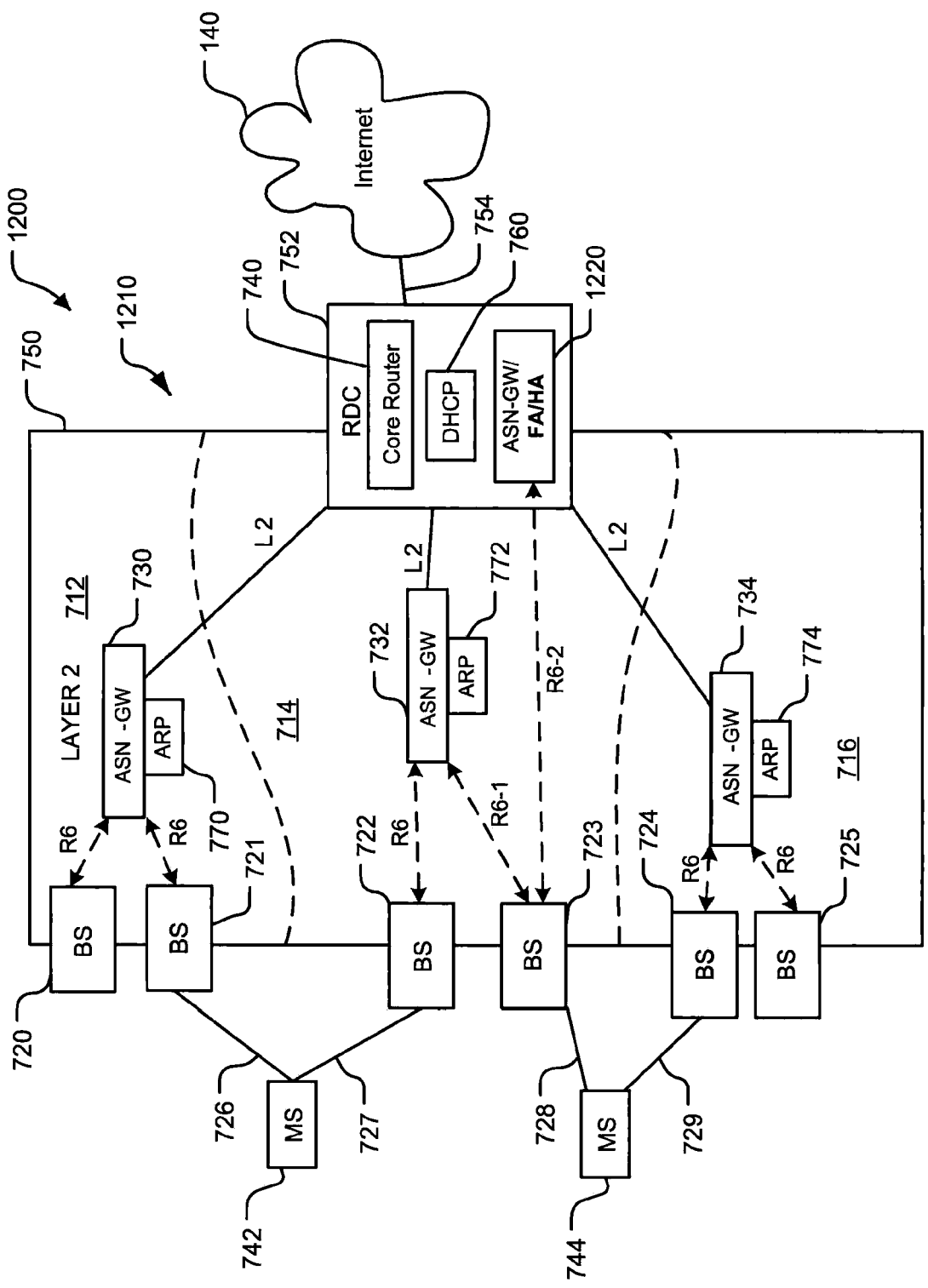

FIG. 16 is a block diagram of a hybrid implementation of a Simple IP ASN that includes distributed ASN-GW routers and MIP components.

DETAILED DESCRIPTION OF THE INVENTION

The following list of abbreviations may be useful in understanding the technology discussed herein:
3G Third Generation (Cellular)
AAA Authentication, Authorization and Accounting
AN Access Network
AP Access Point
ARP Address Resolution Protocol
ASN Access Service Network (Same as AN)
ASN-GW Access Service Network Gateway (router)
BS Base Station
CMIP Client Mobile IP
CSN Core Services Network
DHCP Dynamic Host Configuration Protocol
DNS Domain Name Service
FA Foreign Agent
HA Home Agent
IEEE Institute of Electrical and Electronic Engineers
IETF Internet Engineering Task Force
IOT Inter Operability Tests
IP Internet Protocol
L2 Layer 2
L3 Layer 3
LAN Local Area Network
MAC Media Access Control
MAN Metro Area Network
MEF Metro Ethernet Forum
MIP Mobile IP
MPLS Multi Protocol Label Switching
MS Mobile Station
NAP Network Access Provider
NSP Network Service Provider
PBB-TE Provider Backbone Bridge Traffic Engineering
PHY Physical layer
PMIP Proxy Mobile IP
POA Point of Attachment
QoS Quality of Service
RAN Radio Access Network
RDC Regional Data Center
RRA Radio Resource Allocation
RRC Radio Resource Control
RRM Radio Resource Management
SDH Synchronous Digital Hierarchy
SFA Service Flow Authorization
SFM Service Flow Management
SLA Service Level Agreement
SPWG Service Provider Working Group (WiMAX Forum)
TDM Time Division Multiplexing
VPLS Virtual Private LAN Service
VoIP Voice over Internet Protocol
WAN Wide Area Network
WLAN Wireless Local Area Network
WiFi Wireless Fidelity, refers to 802.11
WiMAX Worldwide Interoperability for Microwave Access Unless defined otherwise, technical and networking terms used herein have the same meaning as commonly understood by one of ordinary skill in the art to which this invention belongs. For purposes of the present description, the term "Simple IP" refers to an access service network ("ASN") configuration that does not utilize any MIP network elements. Specifically, the Simple IP ASN omits the Foreign Agent ("FA") router and Home Agent ("HA") router, as well as other components of MIP as explained below. Further, within the Simple IP ASN all data communications are routed over one or more Layer 2 or data link layer networks using a data link protocol and data link protocol addresses. The term data link or Layer 2 protocol address refers to an address on the Layer 2 network and may include a MAC address, local IP address, port information, and the like.

Aspects of the present invention relate to a network constructed using one or more Simple IP ASNs. While the embodiments of the invention described below are based on WiMAX technologies, those of ordinary skill appreciate that other wireless data communication technologies, such as 3G, and the like, may be used and are within the scope of the present invention.

As mentioned above, within a Simple IP ASN all data communications are routed over one or more Layer 2 or data link layer networks. Therefore, a brief discussion of Layer 2 networks is provided below.

Layer 2 Networks

The application of Layer 2 networks to ASN architecture has been limited because traditionally, those of ordinary skill in the art have assumed Layer 2 networks cannot be scaled beyond the LAN environment. Presently, Layer 2 networks are viewed as limiting the size of an ASN and not as a means of expanding its size. Further, because this assumption has migrated into mobile wireless networks, with respect to macro-mobility, the industry has focused on Layer 3 based approaches such as MIP in 3G and WiMAX architectures.

Ethernet, which is a Layer 2 network protocol, has gained tremendous popularity over the years and is the de-facto standard in enterprise networks. In large part due to this popularity, the speeds (which may be as high as 100 Gbps) at which an Ethernet network may transport data has increased and the cost per port has decreased. Ethernet has a near plug-and-play nature due to its bridge learning and loop avoidance with protocols such as Spanning Tree which are well known in the art. While these protocols are known to work in a LAN environment, they do not scale to larger metropolitan area network ("MAN") and wide area network ("WAN") deployments. As an example, Spanning Tree and Rapid Spanning Tree scale up to only about 20 hops (switches or nodes), or less depending on network configuration. Once that limit is reached, it has traditionally become necessary to introduce a Layer 3 router.

The traditional limitations of Layer 2 networks, such as Ethernet, include limitations in scalability, stability, and traffic engineering. With respect to scalability, Layer 2 switches or bridges use fixed tables to direct traffic based on the MAC address of the endpoints. As a network grows, the number of MAC addresses may increase beyond the capacity of the core switches. If the tables in these core switches become full, the packets must be flooded across entire network, resulting severe performance degradation. With respect to stability, Layer 2 networks are considered less robust compared to more advanced SDH and MPLS approaches for large scale networking. The recovery times for traditional Spanning Tree and other proprietary healing/protection protocols are much higher than that offered by traditionally accepted MAN and WAN technologies. With respect to traffic engineering, traditional Layer 2 networks have few tools to manage the topology of the network. Planning and managing traffic patterns are very difficult.

Despite its limitations, a pure Ethernet network has many positive features. For example, Ethernet interfaces are much less expensive and offer greater granularity of bandwidth than alternate technologies that offer the same class of bandwidth. Ethernet interfaces are ubiquitous in the industry, facilitating very easy interconnection to both core and customer network equipment, which may be an advantage for both network operators and customers.

In recent years, Ethernet based Layer 2 network technologies have been evolving rapidly and recent updates to Ethernet standards, such as IEEE 802.1Qay, include impressive carrier class features that resolve the limitations related to scalability, stability, and traffic engineering described above. Therefore, the older Layer 2 network technologies presently used to construct an ASN, which are subject to the limitations described above, may be replaced with a newer Layer 2 network technology, such as an Ethernet network constructed according to IEEE 802.1Qay, that has resolved one or more of these limitations.

Beyond the IEEE specifications, the networking industry at large has been defining standards and services to take Ethernet beyond the enterprise LAN. For example, the industry has created the Metro Ethernet Forum ("MEF"), which has defined E-Line, E-LAN, and E-tree. E-Line is a service connecting two customer Ethernet ports over a WAN. E-LAN is a multipoint service connecting a set of customer endpoints, giving the appearance to the customer of a bridged Ethernet network connecting the sites. E-tree is a multipoint service connecting one or more roots and a set of leaves, but preventing inter-leaf communication. All three of these services provide standard definitions of such characteristics as bandwidth, resilience, and service multiplexing, allowing customers to compare service offerings, and facilitating Service Level Agreements ("SLAs").

The MEF is also applying these concepts in the wireless backhaul space replacing traditional slow speed high latency Time Division Multiplexing ("TDM") services with native Ethernet services while providing the same Operations, Administration, Maintenance, and Provisioning ("OAM&P"), deterministic path selection, and service definitions to which carriers have become accustomed.

The MEF standards define the services and inter-operability test ("IOT") processes but not how those services are implemented in a carrier network. As is apparent to those of ordinary skill, there are a variety of actual Layer 2 technologies that may be used. Examples of current technologies that provide MEF services are emerging native Ethernet standard PBB-TE, Virtual Private LAN Service (VPLS), and Ethernet-over-Multi Protocol Label Switching ("MPLS"). These evolved Layer 2 technologies are based on some form of tunneling, such as MAC-in-MAC (per IEEE 802.1ah), and traditional Layer 2 flooding/broadcasting and older suboptimal resiliency methods are disabled. The newer techniques create connection oriented, transport networks, suitable for large scale, carrier class transport networking. A Simple IP ASN may be constructed using a Layer 2 network having one or more of the following characteristics:

Operational simplicity and reduced cost;

Scalability;

Traffic engineering tools & resiliency;

Secure, deterministic delivery;

Ethernet tunneling w/full MPLS interoperability; and

Service and transport layer agnostic (the services inside the tunnels could be Ethernet, IP, MPLS pseudo-wires, VPLS, and the like).

A Layer 2 network having one or more of the above characteristics may be viable MAN or WAN technology. While examples of characteristic for selecting a suitable Layer 2 network technology have been provided above, those of ordinary skill in the art appreciate that alternate Layer 2 technologies other than those discussed herein may be used to construct an Layer 2 network that is larger than a traditional ASN or LAN (e.g., a MAN, a WAN, and the like) and such embodiments are within the scope of the present disclosure.

Simple IP

In the context of mobile networks, there is an implicit assumption that IP services and applications will have IP session continuity. In other words, as a mobile station travels around the network, the mobile station will be associated with the same IP address. The real world impact of session continuity is a multi-dimensional issue but there are several fundamental issues involved: (1) where do these Layer 3 boundaries occur; (2) how often are the Layer 3 boundaries traversed; and (3) when these boundaries are traversed, which applications are affected? The third issue listed includes the sub-issues of when and how are these applications deployed.

With respect to the first and second issues, if ASNs are geographically large and their network elements configured to handle an adequately large capacity, the intra-ASN Layer 2 "micro-mobility" zone is large and thus users cross ASN Layer 3 boundaries less often. Because many mobile wireless subscribers spend most of their time within a limited geographical region, an ASN large enough to accommodate the user's limited geographical region (e.g., the dominant range of the user's daily travels back and forth from home to work), reduces the need for mobile wireless subscriber devices to use other ASNs. In Simple IP, advanced Layer 2 technologies, such as those described above, are used to construct an ASN large enough to accommodate the user's limited geographical region. Further, whether a user will cross a Layer 3 boundary may also be determined by location of the boundary. Therefore, border crossings may be reduced by appropriately locating Simple IP ASN borders.

With respect to the third issue, network operators typically minimize capital and operating expenses by centralizing network equipment in regional data centers ("RDCs"). Using advanced Layer 2 technologies, such centralization may be accomplished efficiently. Simple IP ASN network equipment, such as ASN-GW routers, may be co-located in RDCs, or are otherwise efficiently coupled together. In this manner, a user who originally enters a network at one ASN-GW, but later roams into a network served by another ASN-GW, while remaining connected to the original ASN-GW maintains an efficient connection. This is known as ASN anchored mobility.

As mentioned in the Background Section, in an NAP+NSP, a single company owns the networking equipment of both the ASNs and the CSNs. It may be desirable for a NAP+NSP to centralize many of the network functions/equipment into consolidated physical locations, connected using private network connections, which may or may not require Layer 3 routing. For example, the networking equipment of both the ASNs and the CSNs may be located in a Regional Data Center ("RDC"). RDCs are equipment facilities that enable operators to consolidate costs on backhaul transport terminations, facilities, switching/routing platforms, and Internet connections. An operator deploying a WiMAX architecture is quite likely to achieve complexity and cost reduction by co-locating both ASN and CSN equipment in RDCs. Collocating ASN and CSN equipment in RDCs facilitates transitioning between Simple IP and MIP architectures. Further, this arrangement facilitates the incorporation of MIP components into Simple IP ASN implementations.

On the other hand, the ASN-GWs do not have to be collocated in the same RDC. Instead, ASN-GW routers may be distributed within a single ASN and connected to one another using preconfigured ASN-to-ASN interfaces. By configuring these routers to communicate subscriber level information to one another over these ASN-to-ASN interfaces, and connecting these routers to one another using Layer 2 transport technologies, the routers may effectively behave as if they were co-located in the same RDC. An example of a suitable ASN-to-ASN interface includes a Layer 3 "R4" reference point specified by the WiMAX Forum. Using R4 interfaces and Layer 2 technologies, ASN anchored mobility may be provided across very large geographic regions. This further reduces the need for wireless subscriber devices to change ASNs.

By constructing ASNs to be geographically large, to handle a large capacity, and collocating routers, the extended ASN boundaries reduce the need to access the Layer 3 IP subnet (see FIG. 7). Aspects of the present technology provide ASN architectures that provide full mobility for services and applications across a large geographic region without MIP. Such simple IP architectures may be configured to meet the communication requirements of a large and dominant proportion of wireless broadband subscribers.

However, a relatively small portion of wireless broadband users may cross an ASN border. For best effort IP services such as web surfing, seamless service (e.g., IP session continuity) across these boundaries is not a requirement. However, for real-time applications, such as VoIP and Video, seamless service cannot be provided across an ASN boundary without MIP because IP session continuity will be disrupted. Nomadic VoIP and Video services are not affected by ASN border crossings because their requirements are satisfied by large ASN networks, and for this class of subscriber, mobility beyond their pre-defined region is not supported.

Regarding fully Mobile VoIP and Video services, it is generally believed that a relatively small percentage of the total users who require continuous IP coverage will actually cross the above re-defined ASN boundaries configured to provide service within a large service area. Therefore, MIP may be employed to provide cross-boundary services to such users. In other words, an operator may offer Simple IP services for a portion of its subscribers and the potentially more costly MIP services to another portion of its subscribers depending upon their needs. In such a system, the operator may be able to deploy, dimension, provision, and scale the network architecture in accordance with the business requirements and ratios of respective subscribers and services over time. In other words, "pay as you grow."

With the advent of advanced Layer 2 network technologies, continuous IP connectivity can be facilitated for the vast majority of mobile wireless subscribers by simply creating geographically large Simple IP ASNs incorporating large flat Layer 2 transport networks. The service area covered by each Simple IP ASN may encompass most of the areas in which groups of subscribers live, work, and travel. The number of subscribers who are using mobile internet while traversing the Layer 3 service edges of a particular Simple IP ASN may be small relative to the total number of users of the network. For illustrative purposes, presented below are several non-limiting Simple IP ASN implementations.

Centralized Implementation

Referring to FIG. 8, a block diagram of a centralized implementation of an ASN 410 of a network 400 is provided. The network 400 is a Simple IP network, and does not include the FA router 330 or the HA router 332 characteristic of MIP. The ASN 410 has a plurality of BSs 420-425 coupled to an ASN-GW 430 that is optionally located in a RDC 440. The ASN 410 provides wireless data services within a service area to a plurality of mobile stations ("MSs") (e.g., MS 442 and MS 444) located within the service area.

The BSs 420-425 are distributed within the service area and are each configured to send wireless data communications to a portion of the plurality of mobile stations located within the range of the BS. Each of the BSs 420-425 are also configured to receive wireless data communications from the portion of the plurality of mobile stations located within range of the BS. The functionality of a base station, such as BSs 420-425, are well known in the art and will not be described herein.

In FIG. 8, the MS 442 is coupled to the BS 420 and the BS 422 by wireless connections 426 and 427, respectively. For illustrative purposes, it is assumed herein that BS 422 is providing wireless data services to the MS 442. The MS 444 is coupled to the BS 423 and the BS 424 by wireless connections 428 and 429, respectively. For illustrative purposes, it is assumed herein that BS 423 is providing wireless data services to the MS 444.

The ASN-GW 430 is located on an edge of the ASN 410 and is coupled to the BSs 420-425 by a Layer 2 transport network 450. If, as in FIG. 8, the ASN-GW 430 is located inside the RDC 440, the RDC is also located on an edge of the ASN 410. The ASN-GW 430 is coupled to a network layer (Layer 3) network such as the Internet 140 by a Layer 3 connection 452, such as an Internet protocol interface or connection, and the like.

The Layer 2 transport network 450 provides communication between the BSs 420-425 and the ASN-GW 430. The Layer 2 transport network 450 is a flat Layer 2 transport network configured to transport data using a data link layer protocol. The ASN-GW 430 and each of the BSs 420-425 has a Layer 2 protocol address on the Layer 2 transport network 450.

In contrast to the prior art WiMAX model (see FIGS. 5-7), the R6 interfaces that couple each of the BSs 420-425 to the ASN-GW 430 consist only of control plane messaging, not data path traffic. As is apparent to those of ordinary skill in the art, in the prior art, the R6 interfaces are routed Layer 3 connections. Because the BSs 420-425 and the ASN-GW 430 are all located within the same Layer 2 network, these R6 interfaces do not need not to be routed Layer 3 connections. Within the Layer 2 transport network 450, a Layer 2 connection couples the data path traffic from each of the BSs 420-425 to the ASN-GW 430.

Each of the BSs 420-425 includes a Layer 2 Proxy Address Resolution Protocol ("ARP") function 460-465, respectively, which is described in detail in Carl-Mitchell, S., and J. S. Quarterman, "Using ARP to Implement Transparent Subnet Gateways", RFC1027, IETF, October, 1987. Proxy ARP is a method whereby a first network host responds to ARP queries for a network address that the first network host does not have to be configured on the receiving interface(s). Because the first network host is proxying the ARP requests on behalf of another second network host all local network traffic destined to the second network host is directed to the proxying first network host. The captured traffic is then typically routed by the first network host to the second network host via another interface or a tunnel. The ASN 710 can be extended (e.g., additional BSs added thereto) using Proxy ARP without the existing BSs having knowledge of the upstream ASN-GW 430.

In this specific case, the BSs 420-425 will perform Proxy ARP on their north-side interface (towards the ASN-GW 430) on behalf of MSs that are connected via radio interfaces on the south-side of the BSs. The captured traffic will be transmitted to the appropriate MS by the BSs 420-425. In other words, each of the BSs 420-425 direct the ASN-GW 430 to associate its Layer 2 network address with any mobile station (and its network protocol address) communicating wirelessly with the BS. This makes the MSs (e.g., MS 742 and MS 744) appear as though they are connected directly to the ASN-GW 430 via the Layer 2 transport network 450. The BSs 420-425 perform no routing and the ASN-GW 430 "owns" and routes all subscriber IP addresses.

The Layer 2 transport network 450 extends the micromobility region covered by the ASN 410 to encompass a service area that is larger than that currently covered by prior art ASNs. For example, a conventional ASN (see FIGS. 5-7) may cover a service area about 100 square miles. However, the service area of the ASN 410 may cover more than 1,000 square miles. In some implementations, the ASN 410 may cover more than 5,000 square miles. The ASN 410 may cover about 5,000 square miles to about 10,000 square miles. Additionally, the Layer 2 transport network 450 may include more nodes (e.g., base stations) than the Layer 2 transport networks used to construct prior art ASNs. For example, a prior art ASN typically includes only about 200 base stations. In contrast, the ASN 410 may include more than 2,000 base stations. In some implementations, the ASN 410 may include more than 5,000 base stations. The ASN 410 may include about 5,000 base stations to about 10,000 base stations. As is apparent to those of ordinary skill in the art, for a particular geographic region, a relationship may exist between the size of the area to be serviced and the number of base stations used to service the area. Because the ASN 410 may include more nodes (e.g., base stations) than prior art ASNs, the ASN 410 may be constructed by combining the nodes (e.g., base stations) of two or more prior art ASNs into a single ASN configured to encompass the combined service area of the two or more combined prior art ASNs.

The Layer 2 transport network 450 may be constructed using any suitable Layer 2 network capable of transporting data to a larger number nodes than the Layer 2 networks incorporated in prior art ASNS. Further, the Layer 2 transport network 450 may be constructed using any suitable Layer 2 network capable of transporting data over a larger service area than that currently serviced by the Layer 2 networks incorporated in prior art ASNs. Examples of suitable Layer 2 networks which may be used to construct the Layer 2 transport network 450 include IEEE 802.1Qay, PBB-TE, Virtual Private LAN Service ("VPLS"), and Ethernet-over-Multi Protocol Label Switching ("MPLS"), and the like.

In the ASN 410, the ASN-GW 430 may be used as a primary router to the Internet 140. The ASN 410 includes a Dynamic Host Configuration Protocol ("DHCP") server 446, which may be collocated with the ASN-GW 430 in the RDC 440. Each of the plurality of mobile stations (e.g., MS 442 and MS 444) is operable to obtain a network protocol address (e.g., IP address) from the DHCP server 446 and provide that network protocol address to the ASN-GW 430. The ASN-GW 430 is operable to associate the network protocol address of each MS with a Layer 2 protocol address on the Layer 2 transport network 450. The ASN-GW 430 may also associate the network protocol address with the mobile station. As explained above, each of the BSs 420-425 provides its Layer 2 protocol address to the ASN-GW 430 for use as the Layer 2 protocol address of each MS communicating with the BS. Therefore, the ASN-GW 430 is operable to associate the network protocol address of each MS with the Layer 2 protocol address of the BS with which the MS is communicating.

FIG. 9 provides an example of a flow diagram of a method 500 performed by the ASN 410 of FIG. 8 is provided. On initial entry into the network 400, the MS 442 will establish a radio connection with the BS 422, which has a control plane R6 interface to the serving ASN-GW 430 of the Layer 2 transport network 450. The method 500 begins in block 510 when the BS 422 receives a data communication having a destination network protocol address from the MS 442.

In block 520, the BS 422 forwards the data communication to the ASN-GW 430 over the Layer 2 connection "L2" of the Layer 2 transport network 450. The ASN-GW 430 is the "Anchor Router" for IP mobility purposes, much like an HA router 332 in a MIP based architecture (see FIG. 7).

In block 530, the BS 422 directs the ASN-GW 430 to use the Layer 2 protocol address of the BS 422 as the Layer 2 protocol address of the mobile station 442. The Proxy ARP function 462 in the BS 422 must respond to ARP requests from the ASN-GW 430 for the MAC address associated with the MS 442. In this way, the ASN-GW 430 knows the Layer 2 "care-of-address," point of attachment for MS 442 in Layer 2 transport network 450, without having any knowledge of the BS 422 itself.

In decision block 540, the ASN-GW 430 determines whether the destination network protocol address of the data communication is associated with one of the plurality of mobile stations coupled to the BSs 420-425 of the ASN 410. If the destination network protocol address of the data communication is associated with one of the plurality of mobile stations coupled to the ASN 410, the destination network protocol address is internal to the ASN 410 and the decision in block 540 is "NO." Otherwise, the destination network protocol address is external to the ASN 410 and the decision in block 540 is "YES."

If the decision in block 540 is "YES," in block 550, the ASN-GW 430 routes the data communication to the Internet 140 over the Layer 3 connection 452. If the decision in block 540 is "NO," the ASN-GW 430 identifies a Layer 2 protocol address associated with the destination network protocol address of the data communication. For illustrative purposes, it is assumed that the MS 444 is the recipient of the data communication and the destination network protocol address of the data communication is the network protocol address associated with the BS 423. Therefore, in block 560, the ASN-GW 430 identifies a Layer 2 protocol address of the BS 423.

In block 570, the ASN-GW 430 routes the data communication over the Layer 2 transport network 450 to the Layer 2 protocol address associated with the destination network protocol address of the data communication. In other words, the data communication is routed to the BS 423. Then, in block 580, the BS 423 forwards the data communication to the recipient MS 444.

FIG. 10 provides an example of a flow diagram of a method 600 performed by the ASN 410. The method 600 begins in block 610 when the ASN-GW 430 receives a data communication having a destination network protocol address from the Internet 140. For illustrative purposes, it is assumed that the MS 442 is the recipient of the data communication and the destination network protocol address of the data communication is the network protocol address associated with the MS 442. In block 620, the ASN-GW 430 identifies a Layer 2 protocol address associated with the destination network protocol address of the data communication. In other words, the ASN-GW 430 identifies the Layer 2 protocol address associated with the BS 422. Then, in block 630, the ASN-GW 430 routes the data communication over the Layer 2 transport network 450 to the Layer 2 protocol address associated with the destination network protocol address of the data communication. In other words, the data communication is routed to the BS 422. Then, in block 640, the BS 422 forwards the data communication to the recipient MS 442.

Because each of the BSs 420-425 has a direct Layer 2 data path connection to the ASN-GW 430, a different method is used to handover the MS 442 from the BS 422 to the BS 421. In this situation, as part of R6 control plane handover procedures, upon receiving the handover trigger event from the second BS 421 via the R6 interface, the Proxy ARP function 461 in the second BS 421 issues a gratuitous ARP message northbound to update Layer 2 transport fabric in the ASN 410. Once the R6 handover is complete, the BS 421 takes over Proxy ARP responsibilities for the MS 442 and the first BS 422 stops performing Proxy ARP functions. In this way, the ASN-GW 430 always knows the new Layer 2 "care-of-address," point of attachment for MS 442 in Layer 2 transport network 450.

To perform the handover Layer 2 fabric updates, and also minimize Layer 2 ARP broadcast requests for Ethernet address resolution, the BSs 420-425 may use Unicast Polls per RFC1122 (see Braden, R., "Requirements for Internet Hosts-Communication Layers", RFC1122, IETF, October, 1989). Each of the BSs 420-425 may be configured to periodically transmit a Unicast message to the ASN-GW 430 to populate its ARP cache for the network protocol address of all MSs served by the BSs 420-425. Because the ASN-GW 430 is updated by these messages, it will rarely (if ever) need to send a broadcast ARP request. The Layer 2 protocol address of the ASN-GW 430 may be provided to each of the BSs 420-425 so they may send the update messages to it. The Layer 2 protocol address of the ASN-GW 430 may be a configuration parameter of the BSs 420-425. Alternatively, the BSs 420-425 may learn this address automatically. For example, the BSs 420-425 may monitor DHCP server response messages during initial network entry and use them to detect the Layer 2 protocol address of the ASN-GW 430.

This network 400 may have advantages over the conventional MIP architecture. For example, data communications from the MS 442 and the MS 444 are forwarded to the Internet 140 directly by the ASN-GW 430 (at the RDC or regional level) rather than being transported over a long distance Layer 3 (e.g., WAN) network to a HA router in a CSN. This provides the shorter path to the Internet for subscriber traffic. Its also eliminates the WAN, resulting in a reduction in the complexity and/or cost associated with transporting large amounts of traffic over long distances.

In the network 400, multiple prior art ASNs may be combined into one. This consolidation may be accomplished by replacing Layer 3 routers with Layer 2 switches, which are higher performance (lower latency), cheaper, and easier to manage than the Layer 3 routers. Since multiple ASNs have been combined into one, there is no longer a need for Layer 3 R4 inter-ASN interfaces. However, depending on the size of the service area of the ASN, an R4 interface may be used to effect communications between geographically adjacent regional ASNs. However, the dependency on R4 interfaces for interconnecting many small ASNs is significantly reduced.

In the network 400, all MIP related network elements have been eliminated thereby eliminating all deployment and performance costs and complexities associated with MIP. Specifically, the following MIP components and functions have been eliminated:

Client-MIP (CMIP) is not required on the MS 442 and the MS 444

HA routers are not required in the ASN-GW 430 or the RDC 440

PMIP and FA Layer 3 routing functions are removed from the ASN-GW 430, which may reduce the complexity/cost of the ASN-GW.

The single ASN-GW 430 may serve a quantity of BSs that in the prior art are served by multiple ASN-GWs located in separate Layer 3 ASNs. This allows for further reductions in the complexity and/or cost of the network 400 relative to prior art MIP based networks.

Further, with reference to FIG. 6, the following ASN-GW functions may be consolidated in the RDC 440: the Data Path function 220; the Handover Function 222; the Context Function 224; the AAA Client 226; the RRM Relay 232; the Paging Controller 234; the Location Register 236; the Authenticator 238; the Key Distributor 240; the SFA 244; and the Hotline function 230. Several of these ASN-GW functions may be provided by network equipment that a network operator has already deployed elsewhere for other reasons. Subscriber management functions such as Accounting (AAA), QoS (SFA), and Hotlining are all critical network functions that may be provided by non-WiMAX specific network equipment. While the operator may have such functions provided by other pre-existing equipment in the network, these functions may be so critical that the operator may wish to have more flexibility/control over these functions than that provided by a WiMAX specific ASN-GW router. In such situations, it may be advantageous to disable or even remove such functions from the ASN-GW, which could yield further complexity and/or cost reductions to the network operator.

The ASN-GW 430 and the DHCP Server 446 may be co-located in the RDC 440, thus the DHCP Proxy/Relay function 242 may be eliminated from the ASN-GW 430, which may reduce its cost and/or complexity.

Distributed Implementation

Referring to FIG. 11, a block diagram of a distributed implementation of an ASN 710 of a network 700 is provided. The network 700 is implemented as a Simple IP architecture and does not include the FA router 330 or the HA router 332 characteristic of MIP (see FIG. 7). The ASN 710 provides wireless data services within a service area to a plurality of mobile stations (e.g., mobile stations 742 and 744) located within the service area. In the example of FIG. 11, the service area is divided into plural regions 712, 714, and 716.

Each of the regions 712, 714, and 716 includes a plurality of base stations. For example, in FIG. 11, the region 712 includes BS 720 and 721, the region 714 includes BS 722 and 723, and the region 716 includes BS 724 and 725. The BSs 720-725 are distributed within their respective regions and are each configured to send wireless data communications to a portion of the plurality of mobile stations located within the range of the BS. Each of the BSs 720-725 are also configured to receive wireless data communications from the portion of the plurality of mobile stations located within range of the BS. The functionality of a base station, such as BSs 720-725, are well known in the art and will not be described herein.

In FIG. 11, the MS 742 is coupled to the BS 721 and the BS 722 by wireless connections 726 and 727, respectively. For illustrative purposes, it is assumed herein that BS 721 is providing wireless data services to the MS 742. The MS 744 is coupled to the BS 723 and the BS 724 by wireless connections 728 and 729, respectively. For illustrative purposes, it is assumed herein that BS 424 is providing wireless data services to the MS 744.

Each of the regions 712, 714, and 716 also includes an ASN-GW 730, 732, and 734, respectively. The ASN-GWs 730, 732, and 734 are each coupled to the base stations located within the same region as the ASN-GW by a Layer 2 protocol connection. In FIG. 11, a first pair of R6 interfaces couples the ASN-GW 730 to the BS 720 and the BS 721, a second pair of R6 interfaces couples the ASN-GW 732 to the BS 722 and the BS 723, and a third pair of R6 interfaces couples the ASN-GW 734 to the BS 724 and the BS 725, respectively. Each of the ASN-GW 730, 732, and 734 are coupled to a core router 740 by a Layer 2 protocol connection "L2." Together the Layer 2 protocol connections "L2" and the Layer 2 protocol connections coupling the ASN-GWs 730, 732, and 734 to the BSs 720-725 form a Layer 2 transport network 750.

The core router 740 is located on an edge of the ASN 710 and optionally may be located in a RDC 752, which is located on an edge of the ASN 710. The core router 740 is coupled to a network layer (Layer 3) network such as the Internet 140 by a Layer 3 connection 754, such as an Internet protocol interface or connection, and the like.

The Layer 2 transport network 750 provides communication between the BSs 720-725 and the core router 740. The Layer 2 transport network 750 is a flat Layer 2 transport network configured to transport data using a data link layer protocol. The core router 740, ASN-GWs 730, 732, and 734, and the BSs 420-425 each have a Layer 2 protocol address on the Layer 2 transport network 750. Each of the mobile stations (e.g., MS 742 and MS 744) is associated with a Layer 2 protocol address on the Layer 2 transport network 750 allowing the core router 740 to route data communications thereto.

The Layer 2 transport network 750 extends the micromobility region covered by the ASN 710 to encompass a service area that is larger than that currently covered by prior art ASNs. The ASN 710 may cover at least as many square miles as may be covered by the ASN 410 (see FIG. 8). Additionally, the ASN 710 may include at least as many base stations as ASN 410. The network 700 may be constructed by combining the base stations of two or more prior art ASNs into the single ASN 710 configured to encompass a larger service area. The Layer 2 transport network 750 may be constructed using any network suitable for constructing the Layer 2 transport network 450, discussed above.

The ASN-GWs 730, 732, and 734 provide mobility management functions for the BSs of the regions 712, 714, and 716, respectively. However, the ASN-GWs 730, 732, and 734 all belong to a single Layer 2 network and do not perform Layer 3 routing and/or gateway functions.

In contrast to the prior art Layer 3 centric WiMAX model (see FIGS. 5-7), the ASN-GWs 730, 732, and 734 do not have a routed Layer 3 data path traffic interface to the core router 740. Instead, each of the ASN-GWs 730, 732, and 734 include a Layer 2 Proxy ARP function 770, 772, and 774, respectively. The Proxy ARP function operates per RFC1027 as described previously. The ASN 710 can be extended (e.g., additional ANS-GWs and BSs added thereto) using Proxy ARP without the existing ASN-GWs having knowledge of the upstream core router 740. Further, the core router 740 can be an off-the-shelf IP router with no knowledge of WiMAX specific ASN-GWs.

In this specific case, the ASN-GWs 730, 732, and 734 will perform Proxy ARP on their north-side interface (towards the core router 740) on behalf of MSs that are connected via radio interfaces on the south-side of the BSs to which the ASN-GWs 730, 732, and 734 are coupled. The captured traffic will be sent by the ASN-GWs 730, 732, and 734 to the appropriate base station coupled to the Layer 2 transport network 750 using Layer 2 tunneling techniques. In other words, each of the ASN-GWs 730, 732, and 734 direct the core router 740 to associate its Layer 2 network address with any mobile station (and its network protocol address) communicating wirelessly with a base station in the same region of the ASN-GW. This makes the MSs (e.g., MS 742 and MS 744) appear as though they are connected directly to the core router 740 via the Layer 2 transport network 750. The ASN-GWs 730, 732, and 734 perform no routing and the core router 740 "owns" and routes all subscriber IP addresses.

In the ASN 710, the core router 740 may be used as a primary router to the Internet 140. A DHCP server 760 may be collocated with the core router 740 in the RDC 752. Each of the plurality of mobile stations is operable to obtain a network protocol address (e.g., IP address) from the DHCP server 760 and provide that network protocol address to the core router 740. The core router 740 is operable to associate the network protocol address of each of the MSs with a Layer 2 protocol address. The core router 740 may also associate the network protocol address with the mobile station.

As explained above, each of the ASN-GWs 730, 732, and 734 provides its Layer 2 protocol address to the core router 740 for use as the Layer 2 protocol address associated with each MS communicating with the BSs coupled to the ASN-GW. Therefore, the core router 740 is operable to associate the network protocol address of each MS with the Layer 2 protocol address of the ASN-GW coupled to the BS with which the MS is communicating.

FIG. 12 provides an example of a flow diagram of a method 800 performed by the ASN 710 of FIG. 11 is provided. On initial entry into the network 700, the MS 742 will establish a radio connection with the BS 722, which is coupled by an R6 interface to the serving ASN-GW 732 of the region 714. The method 800 begins in block 810 when the BS 722 receives data communication having a destination network protocol address from the MS 742.

In block 820, the BS 722 forwards the data communication to the ASN-GW 732 over the R6 interface coupling the BS 722 to the ASN-GW 732.

In block 825, the ASN-GW 732 directs the core router 740 to use the Layer 2 protocol address of the ASN-GW 732 as the Layer 2 protocol address of the mobile station 742. The Proxy ARP function 772 in the ASN-GW 732 must respond to ARPs from the core router 740 for the MAC address associated with the MS 742. In this way, the core router 740 knows the Layer 2 "care-of-address," point of attachment for MS 742 in Layer 2 transport network 750, without having any knowledge of the WiMAX ASN-GW 732 itself. As the MS 742 moves among BSs which are connected to the same ASN-GW, its mobility is transparent to the core router 740. These BS handovers may be treated as standard R6 (BS-to-ASN-GW) mobility handover events as specified in the WiMAX standards.

In block 830, the ASN-GW 732 forwards the data communication to the core router 740 over the Layer 2 transport network 750 (e.g., over the Layer 2 protocol connection "L2" coupled to the ASN-GW 732 and the core router). The core router 740 is the "Anchor Router" for IP mobility purposes, much like an HA router 332 in a MIP based architecture (see FIG. 7).

In decision block 840, the core router 740 determines whether the destination network protocol address of the data communication is associated with one of the plurality of mobile stations coupled to the ASN 710. If the destination network protocol address of the data communication is associated with one of the plurality of mobile stations coupled to the ASN 710, the destination network protocol address is internal to the ASN 710 and the decision in block 740 is "NO." Otherwise, the destination network protocol address is external to the ASN 710 and the decision in block 740 is "YES."

If the decision in block 840 is "YES," in block 850, the core router 740 routes the data communication to the Internet 140 over the Layer 3 connection 754. If the decision in block 840 is "NO," in block 860, the core router 740 identifies a Layer 2 protocol address associated with the destination network protocol address of the data communication. For illustrative purposes, it is assumed the destination network protocol address of the data communication is the network protocol address of the MS 744. The Layer 2 protocol address associated with the destination network protocol address is the Layer 2 protocol address of the ANS-GW 734 coupled to the BS 724 with which the recipient mobile station 744 is communicating wirelessly. Therefore, in block 860, the core router 740 identifies the Layer 2 protocol address of the ANS-GW 734.

Then in block 870, the core router 740 routes the data communication over the Layer 2 transport network 750 to the Layer 2 protocol address associated with the destination network protocol address of the data communication (i.e., the Layer 2 protocol address of the ANS-GW 734). Upon receiving the data communication, in block 880, the ASN-GW 734 forwards the data communication to the BS 724, which forwards the data communication to the recipient mobile station 744.

If the MS 742 is communicating with the BS 722 and the MS 744 is communicating with the BS 723, both MSs are communicating within the region 714. Under these circumstances, the ASN-GW 732 may route data communications between the MS 442 and the MS 444 over the R6 interfaces without sending those data communications to the core router 740.

FIG. 13 provides an example of a flow diagram of a method 900 performed by the ASN 710. The method 900 begins in block 910 when the core router 740 receives a data communication having a destination network protocol address from the Internet 140. For illustrative purposes, it is assumed the destination network protocol address of the data communication is the network protocol address of the MS 742. In block 920, the core router 740 identifies a Layer 2 protocol address associated with the destination network protocol address of the data communication. The Layer 2 protocol address associated with the destination network protocol address is the Layer 2 protocol address of the ANS-GW 732 coupled to the BS 722 with which the recipient mobile station 742 is communicating wirelessly. Then in block 925, the core router 740 routes the data communication over the Layer 2 transport network 750 to the ASN-GW 732. Upon receiving the data communication, the ANS-GW 732 forwards the data communication to the BS 722, which forwards the data communication to the recipient mobile station 742.

Because multiple groups of BSs are coupled to distributed ASN-GWs 730, 732, and 734 which are all part of the same ASN 710, a new mechanism is needed to handover the MS 742 from the BS 722 coupled to the ASN-GW 732 to the BS 721 coupled to the ASN-GW 730. In this situation, as part of R6 handover procedures, upon receiving the handover trigger event from the second BS 721 via the R6 interface, the Proxy ARP function 770 in the second ASN-GW 730 issues a gratuitous ARP message northbound to update Layer 2 transport fabric in the ASN 710. Once the R6 handover is complete, the ASN-GW 730 takes over Proxy ARP responsibilities for the MS 742 and first ASN-GW 732 stops performing Proxy ARP functions. In this way, the core router 740 always knows the new Layer 2 "care-of-address," point of attachment for MS 742 in Layer 2 transport network 750 without having any knowledge of the WiMAX ASN-GWs 730 and 732.

To perform the handover Layer 2 fabric updates, and also minimize Layer 2 ARP broadcast requests for Ethernet address resolution, the distributed ASN-GWs 730, 732, and 734 may use Unicast Polls per RFC1122, as described previously. Each of the ASN-GWs 730, 732, and 734 may be configured to periodically transmit a Unicast message to the core router 740 to populate and maintain the core router's ARP cache for the network protocol address of all MS that are served by the ASN-GW. Because the core router 740 is updated by these messages, the core router will rarely (if ever) need to send a broadcast ARP request. The Layer 2 protocol address of the core router 740 may be provided to each of the ASN-GWs 730, 732, and 734 so they may send the update messages to the core router. The Layer 2 protocol address of the core router may be a configuration parameter of the ASN-GWs 730, 732, and 734. Alternatively, the ASN-GWs 730, 732, and 734 may learn this address automatically. For example, the ASN-GWs 730, 732, and 734 may monitor DHCP server response messages during initial network entry and use them to detect the Layer 2 protocol address of the core router 740.

This distributed network 700 has many of the same benefits present in the centralized network 400 (see FIG. 8) with respect to the conventional architecture and some additional benefits. For example, the multiple ASNs of the conventional architecture may be reduced to one, but the ASN-GWs 730, 732, and 734 may remain distributed in the ASN 710. Further, the Layer 3 routing functions of the ASN-GWs 730, 732, and 734 have been replaced with less complicated Layer 2 mechanisms that utilize simple, established procedures that are well defined by IETF RFC's. These changes may result in lower complexity ASN-GWs that provide higher performance (lower latency), more scalability, are cheaper, and easier to manage.

The core router 740 that manages all IP routing functions for the network 700 may be an off-the-shelf standard IP router it is not required to function as a MIP HA router (per WiMAX standards), nor is the core router required to function as a ASN-GW router. Therefore, the core router 740 may include less complexity and cost less. Because the complexity and cost of the ASN-GWs is reduced, the ASN-GWs may be more easily distributed over the network.

The distributed ASN-GWs may provide enhanced mobility management for highly mobile networks because the ASN-GW Radio Resource Management (RRM) and mobility management functions are located closer to the BS/MS radio elements. Further, functions associated with mobility events, such as the control and data path functions and messaging including handovers, Context transfers, Idle Mode, Paging, and location updates may provide better performance in the distributed ASN 710 compared to the centralized ASN 410.

While the base stations have been described as each being coupled to a particular ASN located within the same region as the base station, as is apparent to those of ordinary skill in the art, the ASN 710 may be configured to allow any BS to communicate with any ASN-GW using an R6 interface. If a particular ASN-GW fails or becomes overloaded, the BSs connected thereto could terminate communications with that particular ASN-GW and instead, communicate with another ASN-GW. Therefore, the ASN 710 may be viewed as creating a BS-ASN-GW mesh network, which provides resiliency against the failure of one more ASN-GWs. Further, because any BS can communicate with any ASN-GW, there is no need for ASN-GW to ASN-GW communications. Thus, the need for R4 interfaces may be reduced.

In the distributed ASN 710, the ASN-GWs 730, 732, and 734 could be distributed at a ratio of N:1 to the BSs 720-725, which accommodates very flexible network planning. The ratio of ASN-GWs to BSs may be determined by a range of network operator requirements, which may consider network topology and loading. For example, if a service area is comprised of small towns separated by large distances, a large centralized ASN, such as ASN 410, may be unnecessary. A town that requires only three base stations to provide radio coverage may need only a small ASN-GW. Therefore, the distributed ASN 710, which may be configured to include a separate ASN-GW for each town may be appropriate to service the small towns.

Similarly, if a service area includes isolated "hotspot" locations, such as an airport, the loading across the ASN at large is not heavy enough to justify a heavily dimensioned centralized ASN-GW. However, within the region of the service area including the airport, the traffic volume may be very high. In such a situation, it may not be cost effective to add capacity to a centralized ASN-GW simply to meet the capacity requirements of the hotspot location. Instead, the distributed ASN 710 may be used and configured to provide an ASN-GW dedicated to servicing the region including the airport.

The distributed ASN 710 may be viewed as a "boundless ASN" that supports full mobility via clusters of interconnected BSs and ASN-GWs that may be deployed in any distribution or ratio required, over as large of a service area as network operator wishes to deploy.

Hybrid Implementations

The centralized ASN 410 (see FIG. 8) and the distributed ASN 710 (see FIG. 11) each provide benefits over prior art ASNs. While the centralized ASN 410 and the distributed ASN 710 have been described as separate implements, those of ordinary skill in the art appreciate that a network may include both implementations. Because these implementation both utilize the same Layer 2 transport network technologies and may be implemented in RDCs, the centralized ASN 410 and the distributed ASN 710 may be easily mixed together in a network or morphed into each other at different locations and times.

For example, if a service area was originally serviced by an embodiment of the centralized ASN 410 configured based on low mobility usage by subscribers in the service area but over time, the subscribers have become increasingly mobile, the performance of the ASN may be improved by converting it to a distributed ASN. The centralized ASN can be easily converted into the distributed ASN, by simply deploying the ASN-GWs 730, 732, and 734 within the Layer 2 transport network 450 and replacing the centralized ASN-GW 430 with the core router 740.

Alternatively, a service area may have been originally serviced by an embodiment of the distributed ASN 710 configured for use with rural towns having low subscriber density and a heavily mobile environment (due to many highways and country roads) but over time, a few larger cities have been added to the service area causing the subscriber density to increase. In this situation, the distributed ASN 710 may be converted into the centralized ASN 410 by replacing the core router 740 with a large ASN-GW platform (i.e., the ASN-GW 430) and coupling the BSs of the ASN to it. The distributed ASN-GWs (e.g., ASN-GWs 730, 732, and 734) may be phased out over time, where appropriate.

Mobile IP Extensibility

While both the centralized ASN 410 and the distributed ASN 710 may be configured to provide large scale wireless full mobility for many usage scenarios, usage scenarios still exist in which MIP is appropriate. Two examples of such scenarios include the following: (1) use of services and/or applications that require that a mobile station have a constant, static IP addresses at all times, at all locations in the network; and (2) use of a single mobile wireless device (e.g., a mobile phone) that performs inter-technology handovers, for example some mobile wireless device are configured to use both WiFi, 3G, and WiMAX radio access technology and handover between them without interruption to their IP connection.

Therefore, the following implementations incorporate MIP into the Simple IP ASN architectures discussed above.

Centralized Implementation Including MIP

Referring to FIG. 14, a network 1000 including a centralized ASN 1010 incorporating MIP components is provided. Like reference numerals have been used to identify substantially similar components of the centralized ASN 410 (see FIG. 8) and centralized ASN 1010. Only components of the centralized ASN 1010 not present in the centralized ASN 410 will be described in detail. In ASN 1010, an ASN-GW 1030 includes the MIP PMIP/FA router functions and the MIP HA router functions. Alternatively, the FA router and/or HA router may be coupled to the ASN-GW 1030 as separate components.

Within the ASN 1010, the expensive MIP resources that are distributed across many ASN-GWs in the conventional prior art network architecture are consolidated into a single ASN-GW platform that may be located in the RDC 440. Because the ASN-GW functions are centralized in a single large ASN 1010 including the Layer 2 transport network 450, the ASN 1010 may achieve significant complexity/cost reduction as compared to the conventional WiMAX MIP architecture of FIGS. 6-8.

FIG. 15 provides a block diagram illustrating a network 1100 having a first centralized ASN 1110 and a second centralized ASN 1112. While the network 1100 is depicted as having only two ASNs, those of ordinary skill in the art appreciated that additional ASNs may be added to the network 1100 and such embodiments are within the scope of the present description.

Each of the first centralized ASN 1110 and the second centralized ASN 1112 may be constructed in accordance with the centralized ASN 1010. The first centralized ASN 1110 may include an ASN-GW 1120 and the second centralized ASN 1112 may include an ASN-GW 1122. Both the ASN-GW 1120 and the ASN-GW 1122 may be substantially similar to the ASN-GW 1030 (see FIG. 14). Further, the ASN-GW 1120 and the ASN-GW 1122 are collocated in a centralized RDC 1130.

Because each of the ASNs 1110 and 1112 include a Layer 2 transport network 1150 and 1152, respectively, configured to transport data across a service area or between a number of nodes that is greater than that permitted by the Layer 2 transport networks incorporated in prior art ASNs, the geographic size and/or capacity of the ASNs 1110 and 1112 may be much larger than that of prior art ASNs. For example, the first centralized ASN 1110 may service the entire Northeast region of the United States and the second centralized ASN 1112 may service the Southeast region of the United States. However, both ASNs 1110 and 1112 may terminate into the single RDC 1130.

Each of the ASNs 1110 and 1112 may have a PMIP/FA router coupled to or incorporated in the ASN-GW 1120 and 1122, respectively. The ASNs may share a HA router, which may be co-located on the same physical routing platform as the ASN-GW and PMIP/FA router. For example, in the embodiment depicted in FIG. 15, the HA router function is incorporated in the ASN-GW 1120 and accessed by the ASN-GW 1122 over an R3 interface. Alternatively, if a network operator has a centralized HA router that is well connected (e.g., by circuits with low latency and a large available bandwidth) to the ASN-GWs 1120 and 1122, the operator may want to enable only FA router functionality on the ASN-GWs.

In the case of inter-carrier roaming between the ASN 1110, which uses Simple IP with MIP, and an ASN operated by another operator using MIP, enabling FA router functionality in the Simple IP ASN 1110 allows MIP users of the other network to roam inside the ASN 1110.

As illustrated in FIG. 15, it may be desirable to combine the FA router and HA router functionality support in the RDC 1130 or an isolated data center. For example, states like Alaska and Hawaii may not have affordable private circuits available to provide communications between separate locations for the FA router and the HA router. Further, the latency incurred communicating between these routers may impact the customer experience too negatively. These problems may be avoided by combining these routers in the RDC 1130, which may be equipped with top of the line routers having high capacity. Further, the RDC 1130 may include large Internet pipes to multiple carriers, making the RDC a logical point from which to route large amounts of traffic directly to the Internet.

Another advantage of incorporating MIP into the large centralized ASNs 1110 and 1112 is there will be fewer MIP events for the HA and FA routers to manage because mobility events using the FA router only occur during inter-ASN handovers, not intra-ASN base station handovers. Because the ASNs 1110 and 1112 are larger, fewer inter-ASN handovers will occur allowing the ASN-GWs 1120 and 1122 to handle more sessions.

Distributed Implementation Including MIP

Referring to FIG. 16, a network 1200 including a hybrid ASN 1210 incorporating MIP components is provided. Like reference numerals have been used to identify substantially similar components of the distributed ASN 710 (see FIG. 11) and the hybrid ASN 1210. Only components of the hybrid ASN 1210 not present in the distributed ASN 710 will be described in detail.

As discussed above, the distributed ASN-GWs 730, 732, and 734 of the hybrid ASN 1210 may be used to construct a scalable, highly mobile implementation of Simple IP. This flexible, mesh oriented network architecture creates a "Boundless ASN" that may provide most of the features of MIP at a higher level of performance and/or for less cost.

While the PMIP and FA router functions may be incorporated into each of the ASN-GWs 730, 732, and 734 of the ASN 710 of FIG. 11, this approach may not provide satisfactory performance in all cases. In the ASN 710, each of the ASN-GWs 730, 732, and 734 serve a relatively small number of base stations. Therefore, highly mobile subscribers will experience a macro-mobility Layer 3 MIP handover event whenever they transition from one ASN-GW to another. In contrast to the micro-mobility Layer 2 radio handover events, the Layer 3 MIP handover event involves messaging at much higher levels in the network all the way to the HA router. As a result, this approach may be less efficient and could decrease overall performance.

As mentioned above, the core router 740 (optionally located in a RDC 752) need not be Radio Access Network aware. In other words, the core router 740 may have no knowledge of WiMAX network elements. Therefore, in many implementations of the ASN 710, it may not be feasible to incorporate MIP into the core router 740.

Due to these issues, the hybrid ASN 1210 includes a separate centralized ASN-GW 1220. MIP is incorporated into the separate centralized ASN-GW 1220, which may be collocated with the core router 740 in the RDC 752. Therefore, the PMIP and FA router functions are incorporated into the centralized ASN-GW 1220, which is coupled by Layer 2 connections to each of the BSs 720-725. The BSs 720-725 in the hybrid network 1200 each have two R6 interfaces. One of the R6 interfaces "R6-1" is used to communicate with the distributed ASN-GWs 730, 732, and 734. The interface "R6-1" may be used by mobile stations using the Simple IP portion of the ASN 1210. These mobile stations experience micro-mobility within the ASN 1210. The other R6 interface "R6-2" is used to communicate with the centralized ASN-GW 1220. The interface "R6-2" may be used by mobile stations accessing MIP services. The BSs and other network elements in the ASN 1210 may be configured to support provisioning of mobile stations or subscribers based on their network service profile for one of or both Simple IP and Mobile IP.

This approach enables an operator to deploy and scale a Simple IP deployment (e.g., the network 700 of FIG. 11). If and when this operator wishes to offer MIP services, the operator may migrate to MIPv4 with little to no impact to the existing ASN-GW's 730, 732, and 734 or the core routing infrastructure. Because MIP imposes a higher per-subscriber routing cost on the network provider, this approach allows the operator to scale the network elements in accordance with growth of their relevant services, while maintaining a "pay-as-you-grow" approach. This hybrid approach may provide the same scalability improvements for MIP provided by the centralized approach discussed above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An access service network configured to provide wireless data services to a plurality of mobile stations, each having a network protocol address and being located within a service area, the access service network comprising:
   a plurality of base stations distributed within the service area and configured to send wireless data communications to the plurality of mobile stations and receive wireless data communications from the plurality of mobile stations;
   a data link layer network coupled to each of the plurality of base stations, the data link layer network being configured to transport data using a data link layer protocol; and
   a gateway router coupled directly to the data link layer network and an external network, the gateway router being coupled to the external network by a network layer connection and communicating with the external network over the network layer connection using a network layer protocol, the gateway router being configured to:
      associate a data link layer network address with the network protocol address of the plurality of mobile stations, each of the plurality of base stations being configured to direct the gateway router to use the data link layer network address of the base station as the data link layer network address associated with the network protocol address of a portion of the plurality of mobile stations sending data communications to or receiving data communications from the base station,
      receive data communications from the external network over the network layer connection using the network layer protocol, each data communication being addressed to at least one of the network protocol addresses associated with at least one of the plurality of mobile stations,
      forward each data communication received from the external network over the data link layer network using the data link layer protocol to the data link layer network address associated with at least one the mobile stations associated with the at least one of the network protocol addresses, each of the base stations being configured to forward each data communication forwarded thereto by the gateway router to any mobile station receiving data communications from the base station and having the network protocol address to which the data communication is addressed,
      receive data communications from the plurality of mobile stations over the data link layer network using the data link layer protocol, each data communication received including at least one network protocol address, and
      for each data communication of a first portion of the data communications received from the plurality of mobile stations, use the network protocol address included in the data communication to transmit the data communication to the external network, and
   wherein the gateway router comprises a local home agent coupled, by the external network, to a remote foreign agent of a different access service network having a different service area,
   each of the plurality of mobile stations is assigned to the local home agent, with a portion of the mobile stations being located within the different service area of the different access service network and designated as roaming mobile stations,
   the remote foreign agent being configured to provide a network protocol address associated with the remote foreign agent to the local home agent for each roaming mobile station,
   the local home agent is configured to:
      receive data communications addressed to the network protocol addresses associated with the roaming mobile stations over the external network, and
      for each data communication received, route the data communication to the network protocol address associated with the foreign agent provided to the local home agent by the remote foreign agent, and
   the remote foreign agent is further configured to forward each of the data communications received from the local home agent to the mobile station associated with the network protocol address to which the data communication is addressed.

2. The access service network of claim 1, wherein the gateway router is further configured to:
   for each data communication of a second portion of the data communications received from the plurality of mobile stations, use the network protocol address included in the data communication to transmit the data communication over the data link layer network using the data link layer protocol to the mobile station associated with the network protocol address of the data communication.

3. The access service network of claim 1, wherein the different access service network is further configured to receive data communications each comprising a destination network protocol address from the roaming mobile stations, and for each data communication received from the roaming mobile stations, forward the data communication to its destination network protocol address.

4. The access service network of claim 1, wherein the access service network is a first access service network, the first access service network is configured to communicate with a second access service network substantially similar to the first access service network, and gateway router of the first and second access service networks are collocated within a regional data center.

5. The access service network of claim 1, wherein the plurality of base stations comprise at least 5000 base stations.

6. The access service network of claim 1, wherein the service area comprises at least 5000 square miles.

7. The access service network of claim 1, wherein the data link layer network comprises an Ethernet network.

8. The access service network of claim 7, wherein the Ethernet network comprises an IEEE 802.1Qay network, a PBB-TE network, a Virtual Private LAN Service network, or an Ethernet-over-Multi Protocol Label Switching network.

9. The access service network of claim 1, wherein the external network is the Internet.

10. An access service network configured to provide wireless data services to a plurality of mobile stations, each having a network protocol address and being located within a service area, the access service network comprising:
  a plurality of base stations distributed within the service area and configured to send wireless data communications to the plurality of mobile stations and receive wireless data communications from the plurality of mobile stations;
  a data link layer network coupled to each of the plurality of base stations, the data link layer network being configured to transport data using a data link layer protocol; and
  a gateway router coupled directly to the data link layer network and an external network, the gateway router being coupled to the external network by a network layer connection and communicating with the external network over the network layer connection using a network layer protocol, the gateway router being configured to:
    associate a data link layer network address with the network protocol address of the plurality of mobile stations, each of the plurality of base stations being configured to direct the gateway router to use the data link layer network address of the base station as the data link layer network address associated with the network protocol address of a portion of the plurality of mobile stations sending data communications to or receiving data communications from the base station,
    receive data communications from the external network over the network layer connection using the network layer protocol, each data communication being addressed to at least one of the network protocol addresses associated with at least one of the plurality of mobile stations,
    forward each data communication received from the external network over the data link layer network using the data link layer protocol to the data link layer network address associated with at least one the mobile stations associated with the at least one of the network protocol addresses, each of the base stations being configured to forward each data communication forwarded thereto by the gateway router to any mobile station receiving data communications from the base station and having the network protocol address to which the data communication is addressed,
    receive data communications from the plurality of mobile stations over the data link layer network using the data link layer protocol, each data communication received including at least one network protocol address, and
    for each data communication of a first portion of the data communications received from the plurality of mobile stations, use the network protocol address included in the data communication to transmit the data communication to the external network, and
  wherein the gateway router comprises a local foreign agent coupled, by the external network, to a remote home agent of a different access service network,
  a second plurality of mobile stations being assigned to the remote home agent,
  the local foreign agent being configured to:
    for each mobile station of a portion of the second plurality of mobile stations located within the service region of the access service network and designated as roaming mobile stations, provide a network protocol address associated with the local foreign agent to the remote home agent,
    receive data communications from the remote home agent addressed to the roaming mobile stations; and
    route the data communications addressed to the roaming mobile stations thereto over the data link layer network using the data link layer protocol.

11. The access service network of claim 10, wherein the local foreign agent is configured to:
  receive data communications comprising a destination network protocol address from the roaming mobile stations over the data link layer network using the data link layer protocol, and
  for each data communication received from the roaming mobile stations, route the data communication to its the destination network protocol address over the external network.

12. The access service network of claim 10, wherein the gateway router is further configured to:
  for each data communication of a second portion of the data communications received from the plurality of mobile stations, use the network protocol address included in the data communication to transmit the data communication over the data link layer network using the data link layer protocol to the mobile station associated with the network protocol address of the data communication.

13. The access service network of claim 10, wherein the access service network is a first access service network, the first access service network is configured to communicate with a second access service network substantially similar to the first access service network, and gateway router of the first and second access service networks are collocated within a regional data center.

14. The access service network of claim 10, wherein the plurality of base stations comprise at least 5000 base stations.

15. The access service network of claim 10, wherein the service area comprises at least 5000 square miles.

16. The access service network of claim 10, wherein the data link layer network comprises an Ethernet network.

17. The access service network of claim 16, wherein the Ethernet network comprises an IEEE 802.1Qay network, a PBB-TE network, a Virtual Private LAN Service network, or an Ethernet-over-Multi Protocol Label Switching network.

18. The access service network of claim 10, wherein the external network is the Internet.

19. An access service network configured to provide wireless data services to a plurality of mobile stations, each having a network protocol address and being located within a service area, the access service network comprising:
  a plurality of base stations distributed within the service area and configured to send wireless data communications to the plurality of mobile stations and receive wireless data communications from the plurality of mobile stations;

a data link layer network coupled to each of the plurality of base stations, the data link layer network being configured to transport data using a data link layer protocol; and a gateway router coupled directly to the data link layer network and an external network, the gateway router being coupled to the external network by a network layer connection and communicating with the external network over the network layer connection using a network layer protocol, the gateway router being configured to:

associate a data link layer network address with the network protocol address of the plurality of mobile stations, each of the plurality of base stations being configured to direct the gateway router to use the data link layer network address of the base station as the data link layer network address associated with the network protocol address of a portion of the plurality of mobile stations sending data communications to or receiving data communications from the base station, receive data communications from the external network over the network layer connection using the network layer protocol, each data communication being addressed to at least one of the network protocol addresses associated with at least one of the plurality of mobile stations, forward each data communication received from the external network over the data link layer network using the data link layer protocol to the data link layer network address associated with at least one the mobile stations associated with the at least one of the network protocol addresses, each of the base stations being configured to forward each data communication forwarded thereto by the gateway router to any mobile station receiving data communications from the base station and having the network protocol address to which the data communication is addressed, receive data communications from the plurality of mobile stations over the data link layer network using the data link layer protocol, each data communication received including at least one network protocol address, and for each data communication of a first portion of the data communications received from the plurality of mobile stations, use the network protocol address included in the data communication to transmit the data communication to the external network, and wherein the gateway router further comprises a local foreign agent and a local home agent, the plurality of mobile stations is assigned to the local home agent, the local foreign agent and the local home agent each comprise a network protocol address, a plurality of roaming foreign mobile stations each assigned to a remote home agent are connected to the access service network, for each mobile station of the plurality of roaming foreign mobile stations, the local foreign agent is configured to provide its network protocol address to the remote home agent to which the foreign mobile station is assigned, the local foreign agent is configured receive data communications from the remote home agents addressed to the plurality of roaming foreign mobile stations, and route each of the data communications over the data link layer network using the data link layer protocol to the foreign mobile station to which the data communication is addressed, and the local home agent is configured to receive a network protocol address from each remote foreign agent of a different access service network in which at least one of the plurality of mobile stations assigned to the local home agent is roaming, receive data communications addressed to any roaming mobile stations assigned to the local home agent, and forward the data communications received to the network protocol address of the remote foreign agent of the different access service network in which the mobile station is roaming.

20. The access service network of claim 19, wherein the gateway router is collocated within a regional data center with each remote foreign agent of a different access service network in which at least one of the plurality of mobile stations assigned to the local home agent is roaming and the remote home agents to which the plurality of roaming foreign mobile stations connected to the access service network are assigned.

21. The access service network of claim 19, wherein the gateway router is further configured to:

for each data communication of a second portion of the data communications received from the plurality of mobile stations, use the network protocol address included in the data communication to transmit the data communication over the data link layer network using the data link layer protocol to the mobile station associated with the network protocol address of the data communication.

22. The access service network of claim 19, wherein the access service network is a first access service network, the first access service network is configured to communicate with a second access service network substantially similar to the first access service network, and gateway router of the first and second access service networks are collocated within a regional data center.

23. The access service network of claim 19, wherein the plurality of base stations comprise at least 5000 base stations.

24. The access service network of claim 19, wherein the service area comprises at least 5000 square miles.

25. The access service network of claim 19, wherein the data link layer network comprises an Ethernet network.

26. The access service network of claim 25, wherein the Ethernet network comprises an IEEE 802.1Qay network, a PBB-TE network, a Virtual Private LAN Service network, or an Ethernet-over-Multi Protocol Label Switching network.

27. The access service network of claim 19, wherein the external network is the Internet.

28. An access service network configured to provide wireless data services to a plurality of mobile stations located within a service area having a plurality of geographic regions, a portion of the plurality of mobile stations being located within each geographic region of the service area, the access service network comprising:

a data link layer network;

a core router coupled to an external network and the data link layer network, the core router being configured to associate both a network protocol address and an address on the data link layer network with each of the plurality of mobile stations, for each of the plurality of mobile stations, the core router being configured to receive data comprising the network protocol address of the mobile station and send the data to the address on the data link layer network associated with the network protocol address received;

a plurality of gateway routers comprising a gateway router assigned to each of the geographic regions of the service area, each gateway router comprising a data link layer network address and being coupled to the core router by the data link layer network; and a plurality of base stations located within each geographic region of the service area, the plurality of base stations being configured to send data to and receive data from the portion of the plurality of mobile stations located within the geographic region in which the plurality of base stations are located, each of the plurality of base stations located within a particular geographic region being coupled to the gateway router assigned to the particular geographic region by a data link layer connection, each gateway router being configured to:

for each of the mobile stations communicating with the plurality of base stations located within the geographic region to which the gateway router is assigned, direct the core router to use the data link layer network address of the gateway router as the data link layer network address associated with the mobile station;

receive data sent by the core router to the data link layer network address of the gateway router, the data being addressed to the network protocol address associated with one of the mobile stations communicating with one of the plurality of base stations located within the geographic region to which the gateway router is assigned;

forward data received from the core router to the mobile station associated with the network protocol address to which the data was addressed;

receive data from the plurality of base stations connected to the gateway router, each data communication having been sent to a base station of the plurality of base stations by one of the plurality of mobile stations located within the geographic region to which the gateway router is assigned and comprising an internal destination network protocol address associated with one of the plurality of mobile stations located within the geographic region to which the gateway router is assigned, and forward the data communications received from the plurality of base stations over the data link layer connections coupled to gateway router to the one of the plurality of mobile stations associated with the internal destination network protocol address.

29. The access service network of claim 28, wherein each gateway router is further configured to:

receive different data communications from the plurality of base stations connected to the gateway router, each different data communication having been sent to a base station of the plurality of base stations by one of the plurality of mobile stations located within the geographic region to which the gateway router is assigned and comprising an external destination network protocol address not associated with one of the plurality of mobile stations, and transmit the different data communications received from the plurality of base stations to the core router using a data link layer protocol, the core router being configured to route each of the different data communications to the external destination network protocol address of the different data communication.

30. The access service network of claim 28, wherein the access service network is a first access service network, the first access service network is configured to communicate with a second access service network substantially similar to the first access service network, and the core router of the first and second access service networks are collocated within a regional data center.

31. The access service network of claim 28, wherein each of the plurality of base stations comprises at least 5000 base stations.

32. The access service network of claim 28, wherein the service area comprises at least 5000 square miles.

33. The access service network of claim 28, wherein the data link layer network comprises an Ethernet network.

34. The access service network of claim 33, wherein the Ethernet network comprises an IEEE 802.1Qay network, a PBB-TE network, a Virtual Private LAN Service network, or an Ethernet-over-Multi Protocol Label Switching network.

35. The access service network of claim 28, wherein the external network is the Internet.

36. An access service network configured to provide wireless data services to a plurality of mobile stations located within a service area having a plurality of geographic regions, a portion of the plurality of mobile stations being located within each geographic region of the service area, the access service network comprising:

a data link layer network;

a core router coupled to an external network and the data link layer network, the core router being configured to associate both a network protocol address and an address on the data link layer network with each of the plurality of mobile stations, for each of the plurality of mobile stations, the core router being configured to receive data comprising the network protocol address of the mobile station and send the data to the address on the data link layer network associated with the network protocol address received;

a plurality of gateway routers comprising a gateway router assigned to each of the geographic regions of the service area, each gateway router comprising a data link layer network address and being coupled to the core router by the data link layer network; and a plurality of base stations located within each geographic region of the service area, the plurality of base stations being configured to send data to and receive data from the portion of the plurality of mobile stations located within the geographic region in which the plurality of base stations are located, each of the plurality of base stations located within a particular geographic region being coupled to the gateway router assigned to the particular geographic region by a data link layer connection, each gateway router being configured to:

for each of the mobile stations communicating with the plurality of base stations located within the geographic region to which the gateway router is assigned, direct the core router to use the data link layer network address of the gateway router as the data link layer network address associated with the mobile station;

receive data sent by the core router to the data link layer network address of the gateway router, the data being addressed to the network protocol address associated with one of the mobile stations communicating with one of the plurality of base stations located within the geographic region to which the gateway router is assigned;

forward data received from the core router to the mobile station associated with the network protocol address to which the data was addressed;

receive data communications from the plurality of base stations connected to the gateway router, each data communication having been sent to a base station of the plurality of base stations by one of the plurality of mobile stations located within the geographic region to which the gateway router is assigned and comprising an internal destination network protocol address associated with one of the plurality of mobile stations not located within the geographic region to which the gateway router is assigned, and transmit the data communications received from the plurality of base stations to the core router using a data link layer protocol, the core router being configured to receive each data communication, identify a mobile station of the plurality of mobile stations associated with the internal destination network protocol address of the data communication, and send the data communication to the address on the data link layer network associated with the mobile station identified.

37. The access service network of claim 36, wherein each gateway router is further configured to:

receive different data communications from the plurality of base stations connected to the gateway router, each different data communication having been sent to a base station of the plurality of base stations by one of the plurality of mobile stations located within the geographic region to which the gateway router is assigned and comprising an external destination network protocol address not associated with one of the plurality of mobile stations, and transmit the different data communications received from the plurality of base stations to the core router using a data link layer protocol, the core router being configured to route each of the different data communications to the external destination network protocol address of the different data communication.

38. The access service network of claim 36, wherein the access service network is a first access service network, the first access service network is configured to communicate with a second access service network substantially similar to the first access service network, and the core router of the first and second access service networks are collocated within a regional data center.

39. The access service network of claim 36, wherein each of the plurality of base stations comprises at least 5000 base stations.

40. The access service network of claim 36, wherein the service area comprises at least 5000 square miles.

41. The access service network of claim 36, wherein the data link layer network comprises an Ethernet network.

42. The access service network of claim 41, wherein the Ethernet network comprises an IEEE 802.1Qay network, a PBB-TE network, a Virtual Private LAN Service network, or an Ethernet-over-Multi Protocol Label Switching network.

43. The access service network of claim 36, wherein the external network is the Internet.

44. An access service network configured to provide wireless data services to a plurality of mobile stations located within a service area having a plurality of geographic regions, a portion of the plurality of mobile stations being located within each geographic region of the service area, the access service network comprising:

a data link layer network;

a core router coupled to an external network and the data link layer network, the core router being configured to associate both a network protocol address and an address on the data link layer network with each of the plurality of mobile stations, for each of the plurality of mobile stations, the core router being configured to receive data comprising the network protocol address of the mobile station and send the data to the address on the data link layer network associated with the network protocol address received;

a plurality of gateway routers comprising a gateway router assigned to each of the geographic regions of the service area, each gateway router comprising a data link layer network address and being coupled to the core router by the data link layer network;

a plurality of base stations located within each geographic region of the service area, the plurality of base stations being configured to send data to and receive data from the portion of the plurality of mobile stations located within the geographic region in which the plurality of base stations are located, each of the plurality of base stations located within a particular geographic region being coupled to the gateway router assigned to the particular geographic region by a data link layer connection, each gateway router being configured to:

for each of the mobile stations communicating with the plurality of base stations located within the geographic region to which the gateway router is assigned, direct the core router to use the data link layer network address of the gateway router as the data link layer network address associated with the mobile station;

receive data sent by the core router to the data link layer network address of the gateway router, the data being addressed to the network protocol address associated with one of the mobile stations communicating with one of the plurality of base stations located within the geographic region to which the gateway router is assigned; and forward data received from the core router to the mobile station associated with the network protocol address to which the data was addressed; and a central gateway router comprising a local home agent coupled to a remote foreign agent of a different access service network by the external network, the different access service network having a different service area, the plurality of mobile stations being assigned to the local home agent, a portion of the plurality of mobile stations being located within the different service area of the different access service network and designated as roaming mobile stations, for each roaming mobile station, the remote foreign agent is being configured to provide a network protocol address associated with the remote foreign agent to the local home agent, the local home agent being configured to:

receive data communications addressed to the network protocol addresses associated with the roaming mobile stations over the external network, and for each data communication received, route the data communication to the network protocol address associated with the foreign agent provided to the local home agent by the remote foreign agent, wherein the remote foreign agent is further configured to forward each of the data communications received from the local home agent to the mobile station associated with the network protocol address to which the data communication is addressed.

45. The access service network of claim 44, wherein the central gateway router and the core router are collocated within a regional data center.

46. The access service network of claim 44, wherein the different access service network is further configured to receive data communications each comprising a destination network protocol address from the roaming portion of the plurality of mobile stations, and for each data communication received from the roaming mobile stations, forward the data communication to its destination network protocol address.

47. The access service network of claim 44, wherein the access service network is a first access service network, the first access service network is configured to communicate with a second access service network substantially similar to the first access service network, and the core router of the first and second access service networks are collocated within a regional data center.

48. The access service network of claim 44, wherein each of the plurality of base stations comprises at least 5000 base stations.

49. The access service network of claim 44, wherein the service area comprises at least 5000 square miles.

50. The access service network of claim 44, wherein the data link layer network comprises an Ethernet network.

51. The access service network of claim 50, wherein the Ethernet network comprises an IEEE 802.1Qay network, a PBB-TE network, a Virtual Private LAN Service network, or an Ethernet-over-Multi Protocol Label Switching network.

52. The access service network of claim 44, wherein the external network is the Internet.

53. An access service network configured to provide wireless data services to a plurality of mobile stations located within a service area having a plurality of geographic regions, a portion of the plurality of mobile stations being located within each geographic region of the service area, the access service network comprising:
a data link layer network;
a core router coupled to an external network and the data link layer network, the core router being configured to associate both a network protocol address and an address on the data link layer network with each of the plurality of mobile stations, for each of the plurality of mobile stations, the core router being configured to receive data comprising the network protocol address of the mobile station and send the data to the address on the data link layer network associated with the network protocol address received;
a plurality of gateway routers comprising a gateway router assigned to each of the geographic regions of the service area, each gateway router comprising a data link layer network address and being coupled to the core router by the data link layer network;
a plurality of base stations located within each geographic region of the service area, the plurality of base stations being configured to send data to and receive data from the portion of the plurality of mobile stations located within the geographic region in which the plurality of base stations are located, each of the plurality of base stations located within a particular geographic region being coupled to the gateway router assigned to the particular geographic region by a data link layer connection, each gateway router being configured to:
for each of the mobile stations communicating with the plurality of base stations located within the geographic region to which the gateway router is assigned, direct the core router to use the data link layer network address of the gateway router as the data link layer network address associated with the mobile station;
receive data sent by the core router to the data link layer network address of the gateway router, the data being addressed to the network protocol address associated with one of the mobile stations communicating with one of the of base stations located within the geographic region to which the gateway router is assigned; and
forward data received from the core router to the mobile station associated with the network protocol address to which the data was addressed; and
a central gateway router comprising a local foreign agent coupled to a remote home agent of a different access service network by the external network,
a second plurality of mobile stations being assigned to the remote home agent,
a portion of the second plurality of mobile stations being located within the service region of the access service network and designated as roaming mobile stations,
each of the plurality of base stations of each of the geographic regions being coupled to the central gateway router by a data link layer connection,
each of the plurality of base stations of each of the geographic regions being configured to receive data communications comprising a destination network protocol address from the central gateway router over a data link layer connection and forward each data communication to a mobile station of the roaming mobile stations associated with the destination network protocol address,
the local foreign agent being configured to:
for each mobile station within the roaming mobile stations, provide a network protocol address associated with the local foreign agent to the remote home agent,
receive data communications from the remote home agent addressed to the roaming mobile stations, and
for each data communication addressed to a roaming mobile station of the roaming mobile stations coupled to a local base station coupled to the central gateway router by a data link layer connection, transmit the data communication to the local base station over the data link layer connection.

54. The access service network of claim 53, wherein each of the plurality of base stations of each of the geographic regions is configured to receive data from the roaming mobile stations and forward the data received to the central gateway router over the data link layer connection coupling the base station to the central gateway router, and
the local foreign agent is configured to receive data communications over the data link layer connections coupling the central gateway router to each of the base stations, the data communications each comprising a destination network protocol address, and for each data communication received over the data link layer connections coupling the central gateway router to each of the base stations, route the data communication to its the destination network protocol address over the external network.

55. The access service network of claim 53, wherein the central gateway router and the core router are collocated within a regional data center.

56. The access service network of claim 53, wherein the access service network is a first access service network, the first access service network is configured to communicate with a second access service network substantially similar to the first access service network, and the core router of the first and second access service networks are collocated within a regional data center.

57. The access service network of claim 53, wherein each of the plurality of base stations comprises at least 5000 base stations.

58. The access service network of claim 53, wherein the service area comprises at least 5000 square miles.

59. The access service network of claim 53, wherein the data link layer network comprises an Ethernet network.

60. The access service network of claim 59, wherein the Ethernet network comprises an IEEE 802.1Qay network, a PBB-TE network, a Virtual Private LAN Service network, or an Ethernet-over-Multi Protocol Label Switching network.

61. The access service network of claim 53, wherein the external network is the Internet.

* * * * *